(12) United States Patent
Elaasar

(10) Patent No.: US 7,890,923 B2
(45) Date of Patent: Feb. 15, 2011

(54) CONFIGURABLE PATTERN DETECTION METHOD AND APPARATUS

(75) Inventor: Maged E. Elaasar, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1110 days.

(21) Appl. No.: 11/565,700

(22) Filed: Dec. 1, 2006

(65) Prior Publication Data

US 2008/0134135 A1 Jun. 5, 2008

(51) Int. Cl.
G06F 9/44 (2006.01)
(52) U.S. Cl. ............... 717/104; 717/105; 717/106; 717/121; 717/131
(58) Field of Classification Search .......... 717/121, 717/131, 104
See application file for complete search history.

(56) References Cited

U.S. PATENT DOCUMENTS

| | | | | |
|---|---|---|---|---|
| 5,675,801 A | * | 10/1997 | Lindsey | 717/108 |
| 6,748,588 B1 | | 6/2004 | Fraser et al. | |
| 7,000,219 B2 | * | 2/2006 | Barrett et al. | 717/107 |
| 7,533,365 B1 | * | 5/2009 | Hogstrom et al. | 717/105 |
| 7,657,868 B2 | * | 2/2010 | Shenfield et al. | 717/107 |
| 2001/0001882 A1 | | 5/2001 | Hamilton et al. | |
| 2002/0073396 A1 | | 6/2002 | Crupi et al. | |
| 2002/0104068 A1 | * | 8/2002 | Barrett et al. | 717/104 |
| 2005/0055667 A1 | | 3/2005 | Beringer et al. | |
| 2005/0071810 A1 | | 3/2005 | Sutter et al. | |
| 2005/0125772 A1 | | 6/2005 | Kohno | |
| 2005/0257190 A1 | | 11/2005 | Shaburov et al. | |

OTHER PUBLICATIONS

Elaasar, M. et al., "A Metamodeling Approach to Pattern Specification and Detection," in *Proc. of ACM/IEEE International Conference on Model Driven Engineering Languages and Systems (MoDELS)*, Genoa, Italy, 2006 (28 pp.).

* cited by examiner

*Primary Examiner*—Thomas K Pham
(74) *Attorney, Agent, or Firm*—Hamilton, Brook, Smith & Reynolds, P.C.

(57) ABSTRACT

Computer apparatus and method for detecting patterns in structured models, obtains a pattern specification of a subject pattern. The pattern specification (a) defines the subject pattern as a meta-class in a target domain, and (b) specifies one or more pattern roles as meta-properties of the subject pattern. Using the pattern specification, the pattern detector navigates user models, each user model having respective model elements. Through said navigating, the pattern detector looks for structures of model elements that fulfill the pattern roles. The pattern detector indicates conforming pattern instances as detected instances of the subject pattern.

26 Claims, 24 Drawing Sheets

EPATTERN SPECIFICATION
FOR COMPOSITE PATTERN

SIMPLIFIED EPATTERN SPECIFICATION
FOR COMPOSITE PATTERN

CompositeQuery — 111

- compositePort: Collection
- CompositeQuery (compositePort: Collection)
- execute (): Collection
- bindComposite (Collection candidates, instance: Composite): Collection
- bindComponent (Collection candidates, instance: Composite): Collection
- bindLeaf (Collection candidates, instance: Composite): Collection
- bindCompose (Collection candidates, instance: Composite): Collection
- verifyParameter (instance: Composite): boolean
- connectCompositeToComposeUsingOwnedOperation (instance: Composite): Collection
- connectCompositeToComposeUsingClass (instance: Composite): Collection
- connectCompositeToComponentUsingImplementedInterface (instance: Composite): Collection
- connectCompositeToComponentUsingImplementingClassifier (instance: Composite): Collection
- connectComponentToCompositeUsingComposedType (instance: Composite): Collection
- connectComponentToCompositeUsingComposingClassifier (instance: Composite): Collection
- connectComponentToLeafUsingImplementingClassifier (instance: Composite): Collection
- connectComponentUsingImplementedInterface (instance: Composite): Collection
- connectLeafToComponentUsingImplementedInterface (instance: Composite): Collection 102a, 104a, 106a, 108a

FIG. 11

CONFIGURABLE PATTERN DETECTION METHOD AND APPARATUS

BACKGROUND OF THE INVENTION

Patterns are recurring design solutions that have been refined over the years by many practitioners to address common design problems. Patterns are usually informally described in the literature for the purpose of education. However, for tools to work with patterns, they need to be formally specified in a machine consumable format. Once formalized, patterns can be either applied or detected in user models.

Pattern detection is one of the fundamental kinds of analysis that can be performed on structured models. Several approaches for pattern detection are available in today's tools based on the way patterns are formalized. In the most rudimentary case, patterns are not formalized and their algorithms are manually coded for every specific pattern. This approach, although flexible, is usually complex to implement, costly to maintain in addition to being error-prone. A better approach is to model an algorithm as a decision tree (Sauve, Alex, "Systems and Computer Engineering," Masters Thesis, Carleton University, 2005). Although at a higher level of abstraction than code, it still suffers from the same problem, namely the unobvious correspondence between the structure of the pattern and its detection algorithm. The benefits of algorithm flexibility are usually offset by the costs of algorithm validation and maintenance.

When patterns are formalized, detection algorithms tend to be more rigorous. For example, patterns specified with a mathematical notation are usually detected by solvers that employ pattern detection algorithms (see Eden, A. H. et al., "LePUS—A declarative pattern specification language," Technical Report 326/98, Department of Computer Science, Tel Aviv University, 1998). Although this approach mitigates the need to explicitly think about a detection algorithm, it still suffers from few disadvantages. First, models created in most modeling tools need to be converted to this notation before being analyzed; usually at a performance cost. Another disadvantage is the inherent complexity of the used notation to average modelers.

Another approach to pattern formalization is to specify pattern elements as extensions to their domain meta-model elements (see France, R. B. et al., "A UML-Based Pattern Specification Technique, *IEEE Transactions on Software Engineering* 30(3)193-206, March 2004). Patterns defined in such fashion can be detected by an algorithm that traverses the input model guided by the pattern meta-model. This approach mitigates the conversion problem of the mathematical notation. However, it lacks the ability to configure the detection algorithm. It also lacks a context to the pattern definition that is required to reuse the definition and to represent detected pattern instances. Finally, it forces the definition to have the same complexity as the related part of the domain meta-model complicating pattern detection.

A new pattern specification formalism called Epattern has been recently defined by the same assignee of the present invention. The new formalism is proposed as an extension of the Ecore meta-model for the purpose of pattern specification. Epattern adds to Ecore new semantics inspired from the composite structure semantics of UML 2.0. As a meta-modeling approach, Epattern focuses mainly on the specification of patterns rather than on their detection algorithms and has simpler semantics than those of the mathematical approaches. What is lacking in Epattern is a configurable pattern detection strategy that integrates with all the semantics of the formalism and allows the pattern author to use some knowledge from the target domain to make it more efficient and scalable.

Pattern specification is a common denominator to most work in applied pattern research. Various approaches have been proposed for pattern specification (Baroni, A. et al., "Design Patterns Formalization", *Ecole Notionale Superieure des Techniques Industrielles, Research Report 03/3/INFO,* 2003 and Technical Report 2002). One category of approaches, that Applicant's work also belongs to, uses meta-modeling techniques. The work presented in Guennec, A. et al., "Precise Modeling of Design Patterns," *Proceedings of UML* 2000, Vol. 1939 of LNCS, pp. 482-496, Springer Verlag 2000 and Mak, J. "Precise Modeling of Design Patterns in UML," in *Proceedings of the 26th International Conference on Software Engineering,* 2004, proposes specifying a pattern as a UML 1.5 meta-collaboration with pattern roles typed with M1 classes stereotyped <<meta>> and named after meta-classes. This obviously prevents writing constraints for such roles as their type information is not available at level M1. Also the binding between a role and an element playing that role is modeled with an explicit dependency relationship. This is in contrast to Applicant's approach which depends on a natural binding between an attribute of a class (the role) and its value (the bound element).

The work in Kim, D., "A UML-Based Metamodeling Language to Specify Design Patterns", in *Proceedings of WISME, UML Conference,* October 2003, introduces the RBML language, which is used to specify UML patterns as specialized UML meta-models. Pattern roles are specified as sub-classes of their base meta-classes in UML and are related to each other through new meta-associations. One problem with specifying a pattern as a meta-model, rather than a meta-class as in Applicant's approach, is the inability to inherit or compose the pattern which hinders scalability. Another disadvantage is that role binding is done through a generic mapping scheme and is not conveniently an instantiation of the pattern meta-class and an assignment of role values.

Restated, Applicant finds that use of domain model data (model objects) instead of meta-data (as in the present invention) to describe a pattern limits the expression of the pattern to the semantics of the domain model. This poses a problem if the domain does not have sufficient semantics to completely specify a pattern. Also, this complicates building domain-independent tools that read and process pattern definitions for the purposes of application or detection.

Another proposal is found in Maplesden, D. et al., "Design Pattern Modelling and Instantiation using DPML," in *Proceedings of Tools Pacfic* 2002, p. 18-21, Sydney, Australia, February 2002, where the DPML language is used to visually specify patterns as a collection of participants, dimensions (multiplicities), relationships and constraints. One drawback is the non-standard notation adopted by the language. Another problem is the restriction of the participants and relationships to predefined types from the UML domain, which limits the scope of the patterns definable by the language. Also, there is no mention of complexity management features.

Another approach (Albin-Amiot, H. and Y. G. Gueheneuc, "Metamodeling Design Patterns: Application to Pattern Detection and Code Synthesis", in *Proceedings of the ECOOP* 2001 *Workshop on Adaptive Object-Models and MetaModeling Techniques,* 2001) provides a meta-model to specify patterns. This meta-model is first specialized with pattern domain meta-classes (i.e., meta-classes for every role) before being instantiated to produce an abstract model (pattern specification). Then that model is either instantiated to create a concrete model (pattern instance) or parameterized to use in pattern detection. The provided meta-model contains pattern-domain meta-classes in addition to meta-classes from a target domain (e.g., UML) defined as their subclasses. This need to redefine required meta-classes from the target domain in the pattern meta-model greatly limits the generality and practicality of the approach.

To summarize the key differences with Applicant's pattern modeling framework (PMF), most of the above approaches lack the ability to specify patterns for languages other than UML or viewpoints other than the class diagram. They also lack features (e.g., user-defined associations and composition) that help alleviate the complexity of pattern specification. Additionally, some specify M2-level patterns at M1 which deprives them from using free features like pattern constraints and role binding through pattern instantiation. Finally they lack a well-defined process that allows pattern authors the tools to build, refine and simplify patterns in a stepwise manner.

SUMMARY OF THE INVENTION

A main idea of the present invention provides a pattern detection system (method and apparatus) for Epattern. The invention system is usable to detect pattern instances in structured models using the specifications of those patterns as expressed in Epattern. The invention pattern detection is:

generic enough to be automated from Epattern specifications, integrated with and leverages the semantics of Epattern, configurable by some special detection semantics, and able to easily and accurately report on the detection results.

In a preferred embodiment, a computer system and method for detecting patterns in structured models, comprising the steps of:

obtaining a pattern specification of a subject pattern, the pattern specification (a) defining the subject pattern as a meta-class in a target domain, and (b) specifying one or more pattern roles as meta-properties of the subject pattern; and using the pattern specification, navigating user models, each user model having respective model elements. The navigating step includes looking for structures of model elements that fulfill the pattern roles, and returning conforming pattern instances as detected instances of the subject pattern.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 11 illustrates the composite pattern query class in an embodiment of the present invention.

DETAILED DESCRIPTION OF THE INVENTION

Figure 1:
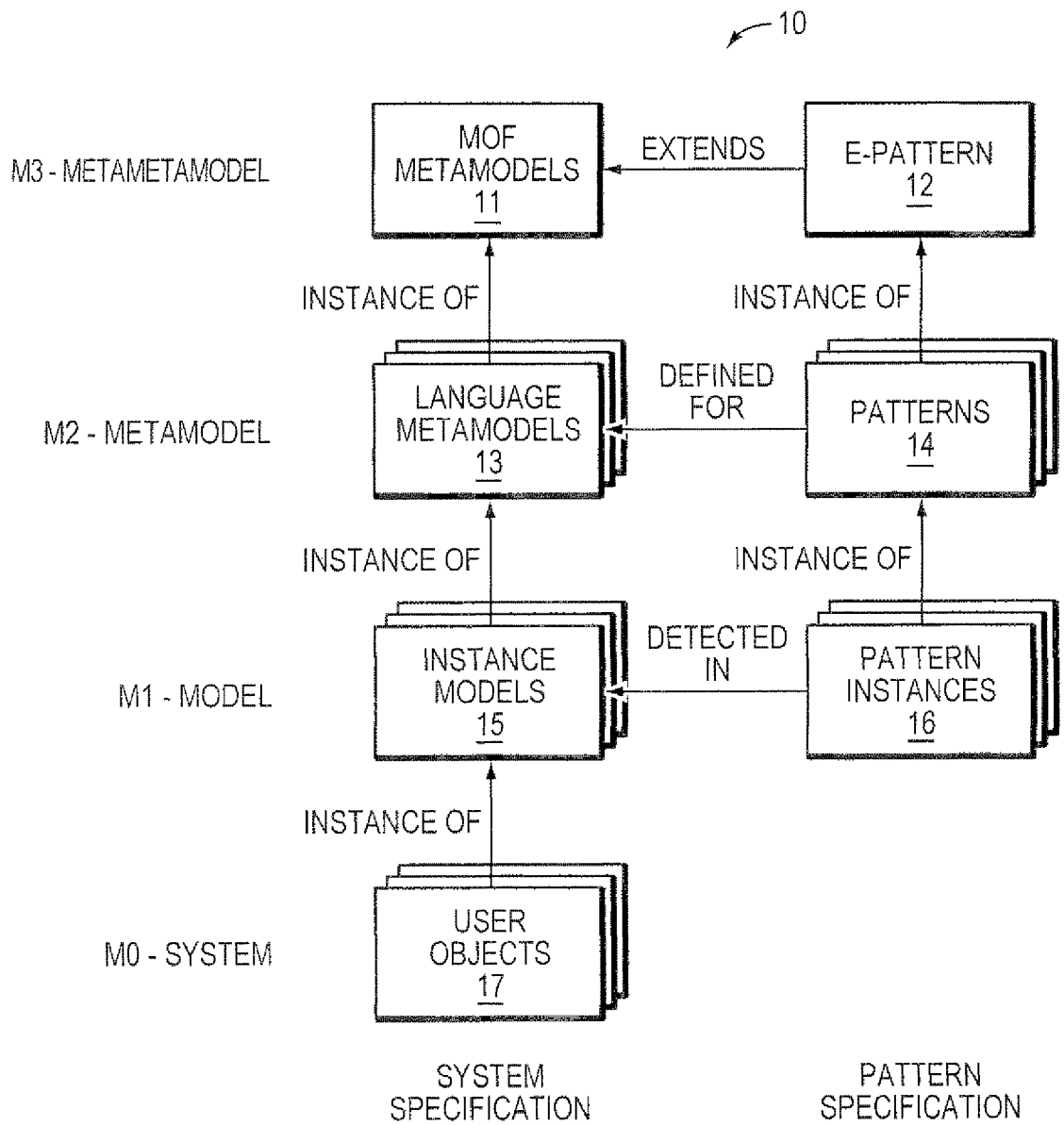
FIG. 1 illustrates pattern specification using OMG's meta-modeling architecture.

The Pattern Modeling Framework (PMF) offers a new approach to pattern specification according to the present invention. As illustrated in FIG. 1, the framework adopts an architecture that is compatible with the OMG's 4-layer meta-modeling architecture. In the meta-modeling architecture, the Meta Object Facility (MOF) M3 level is used to define meta-models 11 for various modeling languages 13 at the M2 level. User models 15 at the M1 level that conform to those languages 13 can then be defined. When these user models 15 are deployed, user objects 17 instantiating them are created (M0 level). One realization of that architecture (left side of FIG. 1) is provided by the Eclipse Modeling Framework (EMF) for the Eclipse platform.

Along the same lines, PMF 10 defines a pattern specification language 12 as an extension to MOF (M3 level). The new pattern specification language 12 of the present invention is used to specify patterns 14 in any MOF compliant modeling language 13 (M2 level). Pattern instances 16 conforming to those patterns 14 are hence defined in terms of instance models 15 (M1 level). This conformance in architecture gives PMF 10 the advantage of being able to specify patterns 14 on any MOF-compliant modeling language 13 (i.e., not only UML) and even patterns that involve multiple modeling languages (e.g., patterns spanning both UML and Business Process Modeling language) and viewpoints (e.g., patterns spanning both UML class and interaction diagrams).

In the present invention, the pattern specification language 12 provided by PMF is called Epattern and is defined as an extension to the MOF 2.0 specification (OMG. MOF Core Specification v2.0. OMG Document formal/Jun. 01, 2001).

The Eclipse Modeling Framework (EMF) provides the Ecore metamodel, which is an implementation of a subset of MOF called EMOF (Essential MOF), whose semantics resemble those of simple UML class diagrams. Ecore is widely used today to specify various language meta-models including that of UML 2.0, which is available as an open source project (UML.2: EMF-based UML 2.0 Metamodel Implementation at www.eclipse.org/uml2) and used by modern UML tools like RSA and EclipseUML. EMF provides tooling for specifying Ecore meta-models and generating corresponding java APIs for them. The Epattern language is realized as an extension to Ecore, which gives PMF two further advantages: the ability to reuse a lot of the development tools provided for Ecore and the seamless integration with popular Ecore-based modeling tools.

An Overview of Relevant UML2 Composite Structure Semantics

A composite structure (CS) diagram is basically a view on the internal structure of a structured classifier (e.g., Class, Collaboration . . . etc). In class diagram semantics, a class has a list of properties, operations, signal receptions and template parameters. In composite structure semantics, a class has in addition a list of connectors and ports. Properties of a structured classifier in a CS diagram are called 'roles' (those with aggregation kind set to composite are also called 'parts'). Roles show up as boxes with their name and type in a CS diagram. Connectors are lines connecting roles and semantically indicate how they are inter-related. A connector can be typed with an association, whose name is shown as a connector. Ports, little square shapes that sit at the boundaries of a structure diagram, define access points to the structured classifier roles. A port, can be delegating in or out of a classifier and typed with types that are conformant to the types of roles it is delegating to or from within the classifier. Roles can also be constrained by constraints defined in the context of the owning class that refer to those roles.

An Overview of Relevant Ecore Semantics

The semantics of Ecore are basically a subset of those of a UML class diagram. An Ecore model is structured into a set of named EPackages that represent unique name spaces. An EPackage can own a set of nested EPackages and a set of EClassifiers. An EClassifier is a named element that can be either an EClass representing a complex type, or an EDataType representing a simple type. The structure of an EClass is specified with a set of EStructuralFeatures, representing the properties of the class, while the behavior of an EClass is specified with a set of EOperations, representing the operations of a class. An EStructralFeature and an EOperation are named and typed elements. An EStructuralFeature can either be an EAttribute, typed with a simple data type, or an EReference, typed with an EClass. EReferences can represent both containment and non-containment references. An EOperation has a return type and a set of EParameters that are themselves typed and named elements representing the inputs of the operation. An EClass can either represent a class or an interface and can extend off a set of EClasses forming a hierarchy.

The present invention Epattern language 12 contains semantics/constructs that are inspired from similar ones in UML 2.0 composite structure diagrams (CSD) (OMG. UML 2.0 Suprestructure Specifications. OMG Document formal/May 07, 2004) and that are used in Epattern to specify patterns. That is, the Epattern language (FIG. 4a described below) is an extension to the Ecore model that adds the semantics of UML2 structure diagram. CSDs were recently added to UML to depict the internal structure of a classifier (such as a class, a component, or a collaboration), including the interaction points of the classifier to other parts of the system. While class diagrams model a static view of class structures, including their attributes and operations, CSDs model usage patterns of these structures. For instance, properties of a classifier in a CSD are called parts. A part describes the role of an instance of a given classifier in the context of the part's owning classifier. Parts can be connected to each other using connectors. A connector describes an instance of a relationship defined by the meta-model between objects bound to the two connected parts. A CSD diagram also depicts the classifier's ports. A port defines the interaction point between a classifier and its environment and also between the classifier and its internal parts.

One known use of CSDs is to describe patterns in UML instance models 15 (M1 level). However, as CSDs are part of the UML 2.0 meta-model 13 (M2 level), they cannot be used to specify general pattern structures involving elements of that same meta-model, or any other M2 meta-model 13. To specify such patterns one needs similar capabilities at level M3. To address this problem the invention Epattern language 12, defined at the M3 level, reuses some of the CSD semantics and applies them to specify patterns in language meta-models 13.

Once patterns 14 are specified in Epattern 12, their specifications can be used to derive the present invention detection algorithms for instances of those patterns in user models. The Epattern language contains some semantics that can be used by pattern authors to fine tune the derivation of these algorithms without affecting the declarative definition of patterns. These semantics revolve around making certain collections in the Epattern meta-model "ordered", which gives pattern authors a chance to order these collections in such a way as to make the algorithms more efficient. Such "ordering" is not needed for the declarative specification of patterns.

Furthermore, PMF includes a graphical, stepwise, and iterative process to guide the user for specifying patterns, addressing their complexity and detecting their instances 16 in user models. The process is supported in the provided tooling of the framework. For instance, an editor is provided to allow users to specify their patterns, a code generator is used to generate specific detection algorithms from the pattern specification, a runtime environment is provided for the algorithms to rule on user models, and a visualization environment is provided to show the detected instances of the pattern.

The Epattern language 12 can be used to formally specify patterns on MOF-compliant modeling languages. As mentioned above, Epattern is designed as an extension to MOF and realized as an extension to Ecore, which includes the concepts necessary to specify meta-models of EMOF-compliant languages including UML 2.0 as well as any target domain structurally described by a meta-model. The following description refers to concepts defined by Ecore rather than EMOF as a simplification (not a limitation) because the terminology used there is closer to the one for the preferred embodiment of Epattern 12.

Figure 2:
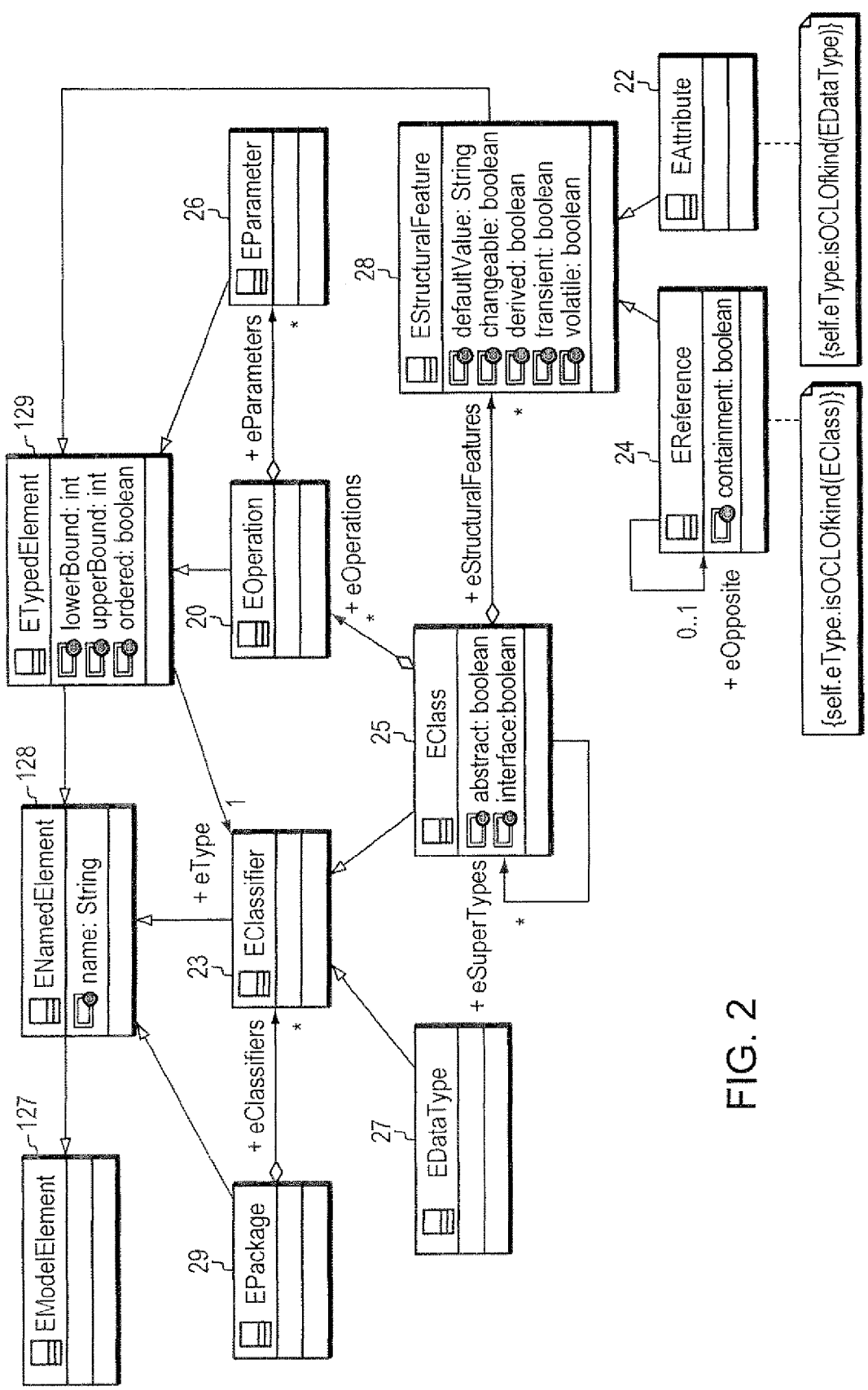
FIG. 2 is a diagram of a simplified Ecore meta-model.

A simplified meta-model 21 of Ecore is shown in FIG. 2. All elements in the ECore meta-model 21 extend off EModelElement 127. Elements that have a "name" property extend off ENamedElement 128 (subclass of EModelElement 127). Elements that also have a "type" property (a reference to an EClassifier 23 explained later) extend off ETypedelement 129 (subclass of ENamedElement 128). In addition to a type, an ETypedElement 129 also has a "lowerbound" and an "upperbound" integer properties representing the multiplicity of the element, in addition to a boolean "ordered" property that is only applicable when the element has a "many" multiplicity.

A concept in a modeling language is specified using an EClassifier 23 (subclass of ENnamed Element 128), that has two subclasses: an EClass 25 representing a complex type (e.g. 'Property' in UML) and an EDatatype 27 representing a simple type (e.g., 'AggregationKind' in UML). EClassifiers 23 are physically arranged in hierarchical namespaces represented by EPackages 29 (subclass of ENamedElement 128). EClasses 25 can either represent classes (including abstract ones through the abstract property) or interfaces (through the interface property) and may be organized into generalization hierarchies (the eSuperTypes self reference).

The structure of an EClass 25 is specified with a set of EStructuralFeatures 28, representing the properties of a class, while its behavior is specified with a set of EOperations 20, representing the operations of a class. An EStructuralFeature 28 (subclass of ETypedElement 129) has two subclasses: an EAttribute 22, typed with all EDataType 27 (e.g. the 'aggregation' EAttribute of the 'Property' meta-class in UML), and an EReference 24, typed with an EClass 25 (e.g. the 'type' EReference of the 'Property' metaclass in UML). An ERefernce 24 has a Boolean containment property specifying whether the reference's value is owned (true) by the class or is referenced (false) by the class. An EReference 24 also has an optional eOpposite property that is set if the EReference represents one end of a bidirectional association between two classes. An EOperation 20 (subclass of ETypedElement 129) has an EClassifier 23 return type inherited from its super class. It also has a list of EParameters 26 (subclass of ETypedElement 129) that is inherited from its superclass.

The Epattern 12 language defines semantics for pattern specification that extend off those of Ecore. The following description uses a working example to explain these semantics, illustrates their graphical notation, and describes a recommended process for using them to specify patterns 14.

WORKING EXAMPLE

Figure 3:
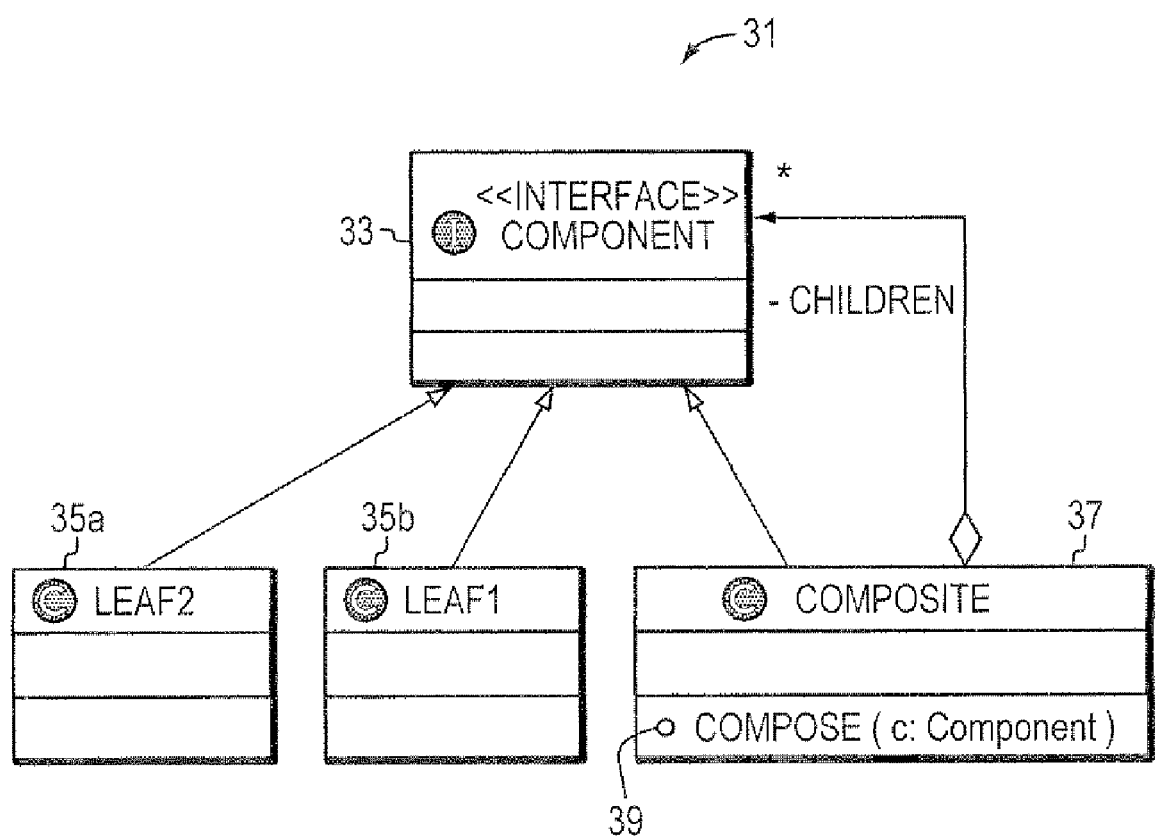
FIG. 3 is a diagram of a simplified GoF composite pattern.
Figure 7:
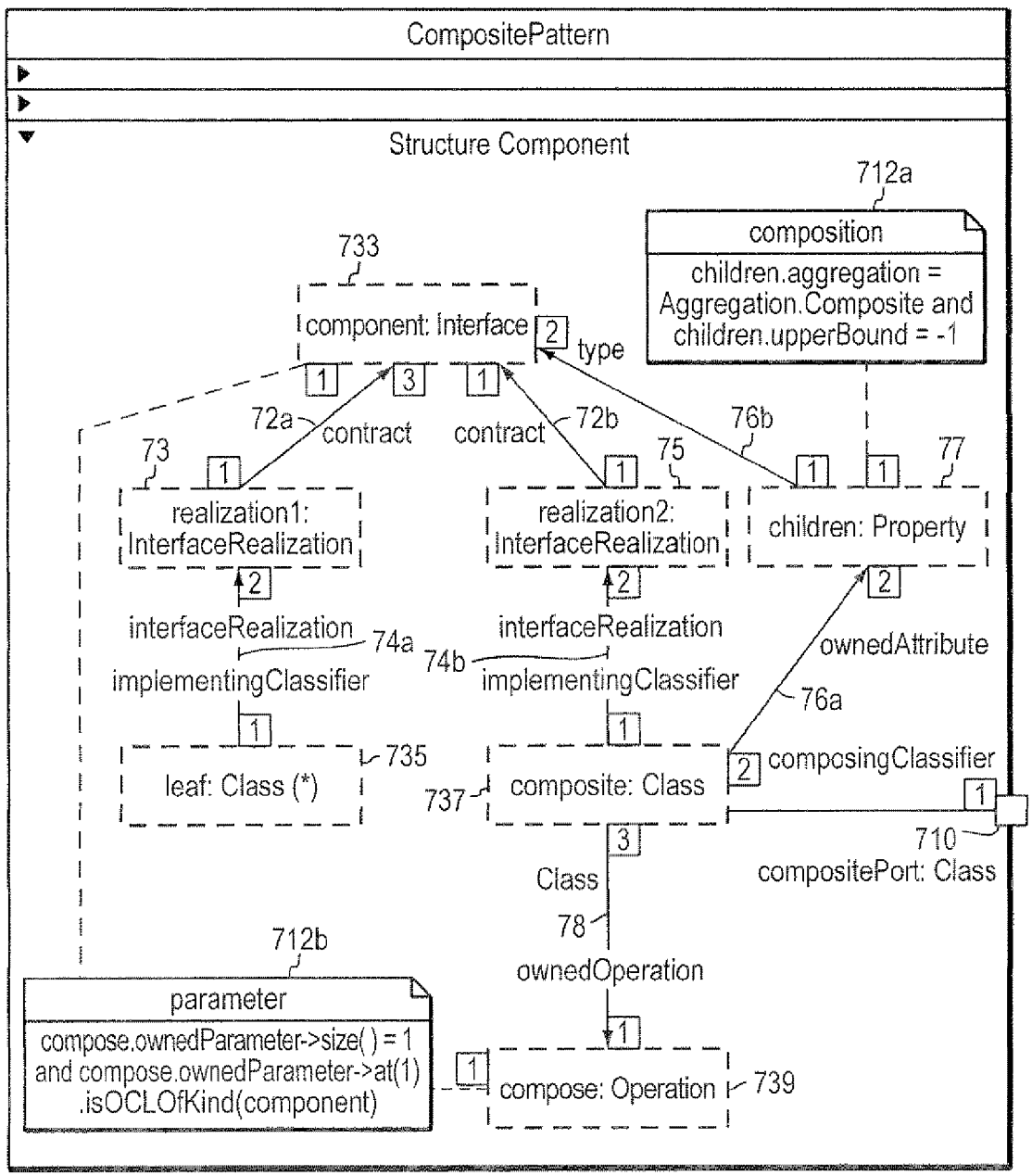
FIG. 7 illustrates Epattern specification for composite pattern according to the present invention.
Figure 8:
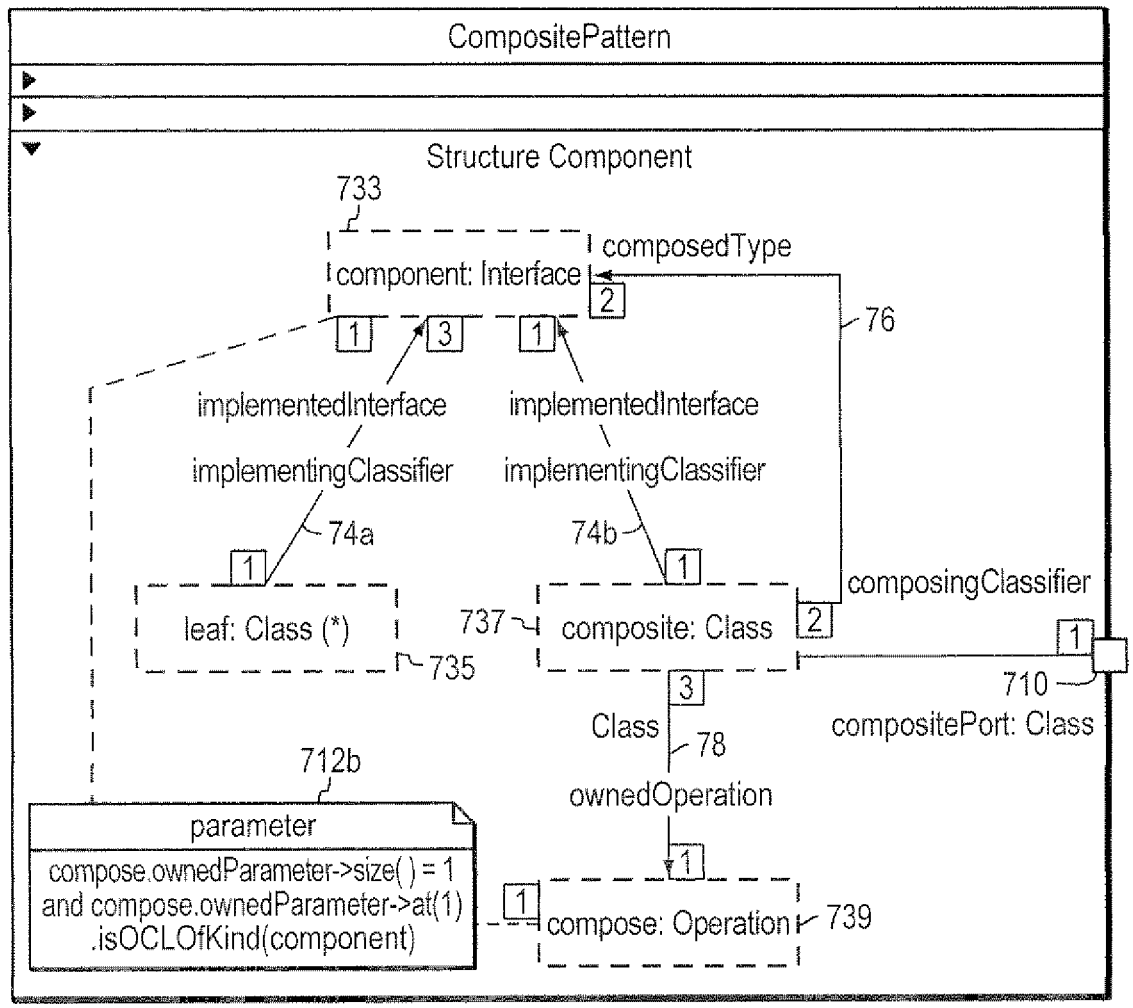
FIG. 8 illustrates a simplified Epattern specification for composite pattern according to the present invention.

An example composite pattern 71 of the present invention is illustrated in FIGS. 7 and 8. By way of background the example is a simple variant of the known Gang of Four (GoF) composite pattern 31, shown in FIG. 3. The pattern's M2 target language is UML 2.0. It is classified as a structural pattern and is used to allow a client to treat both single components and collections of components identically. The pattern 31 highlights several roles a 'component' role 33 representing an instance of UML Interface, a 'leaf' role 35 representing an instance of UML Class that implements the 'component' interface, a 'composite' role 37 representing an instance of UML Class that implements the 'component' interface and also composes instances of the same interface, and finally a 'compose' role 39 representing an instance of UML operation defined by the 'composite' class and used to compose 'component' instances.

Representation of the composite pattern 31 in the present invention (as shown at 71 in FIGS. 7 and 8) is then achieved as follows.

Semantics

Figure 4A:
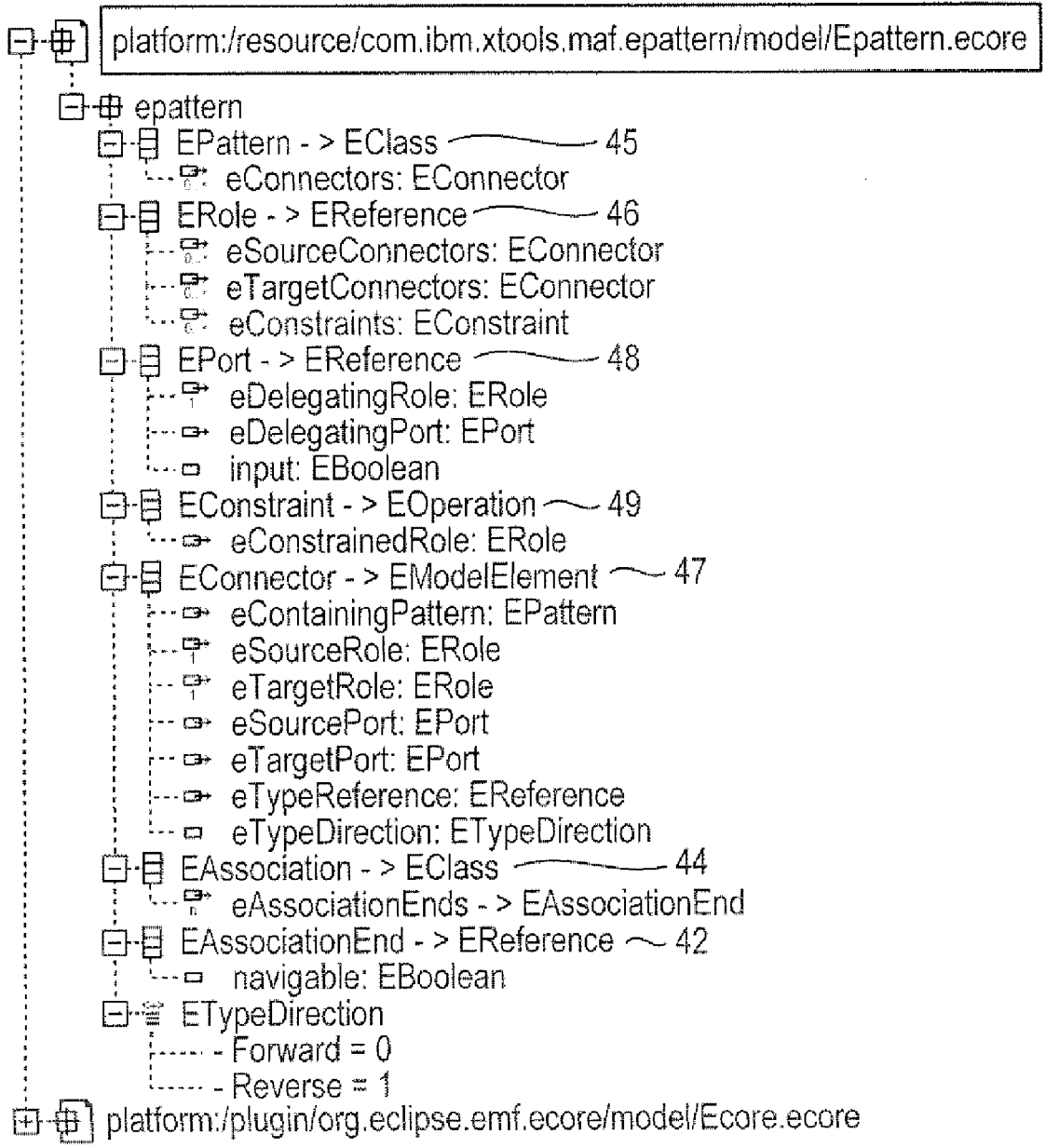
FIGS. 4a and 4b are schematic views of the Epattern model and the Epatter meta-model, respectively.
Figure 4B:
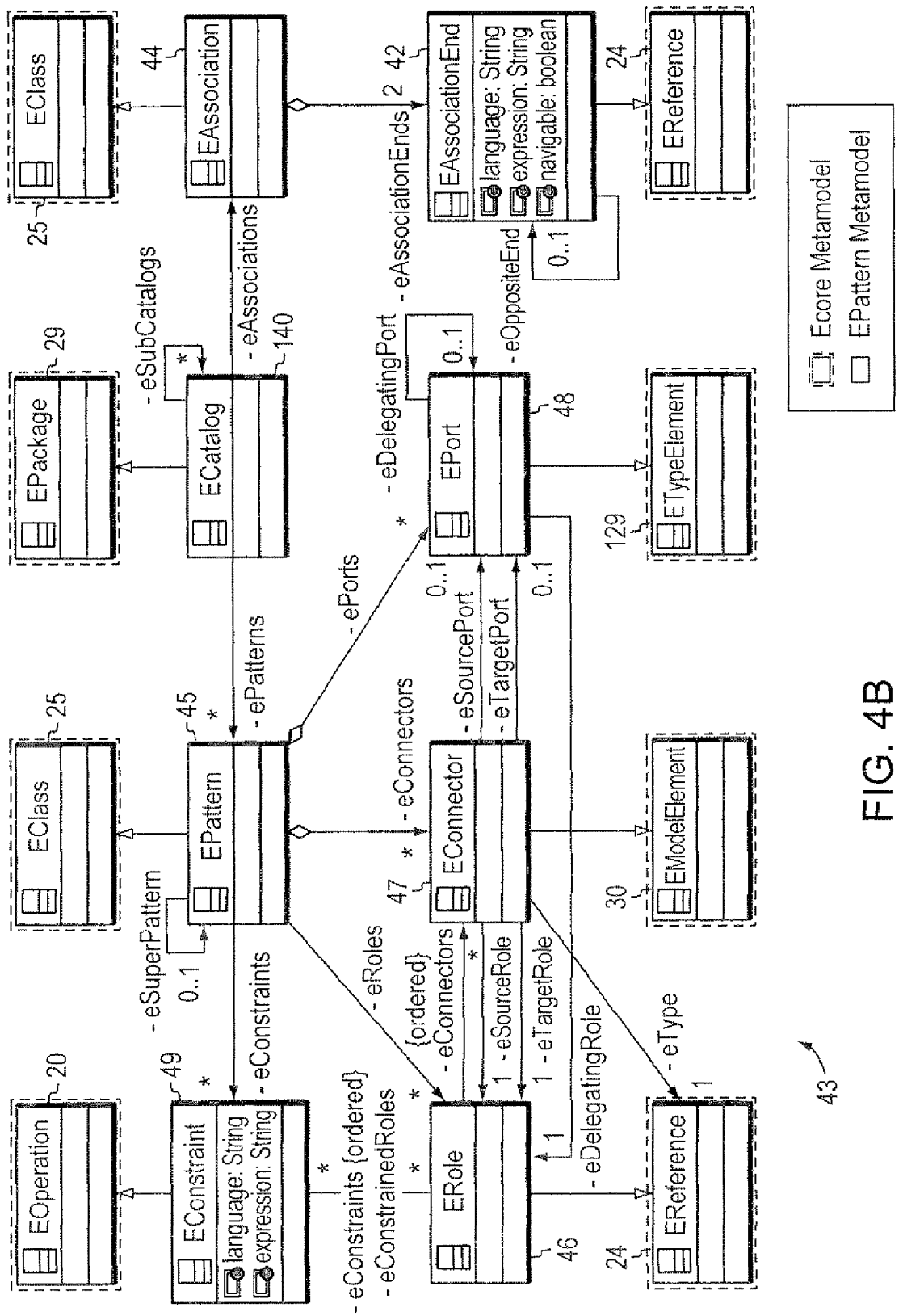

The model 41 and meta-model 43 of Epattern 12, shown in FIGS. 4a and 4b, contains new meta-classes that subclass others in the Ecore meta-model. The following items describe the semantics of these new meta-classes and a feature level description is provided in Appendix A.

ECatalog 140 subclasses EPackage 29 and represents a namespace for a family of EPatterns 45 and EAssociations 44 (to be discussed ahead) through the features ePatterns and eAssociations, respectively. A pattern catalog can be nested within other catalogs to represent a hierarchical name space.

In the example, the composite pattern is defined in the 'structural' catalog, which is defined in the 'gof' (Gang of Four) catalog, resulting in the hierarchical namespace: 'gof.structural.Composite' for example.

EPattern 45 subclasses EClass 25 and is considered the context of a pattern 14 (i.e., represents a pattern's context). A pattern 14 is represented as an instance of EPattern 45 (M3) and therefore a meta-class (M2) at the same level as the target meta-model. An EPattern 45 inherits the name and is Abstract features of an EClass 25 representing the name of a pattern 14 and whether it is abstract or concrete. It also inherits the eStructureFeatures collection that holds the pattern's roles and ports and the eoperations collection that holds the pattern's operations. A new collection is defined for EPattern 45 called eConnectors, which holds the connectors between the pattern roles.

Thus, representing a pattern 14 as a meta-class has several advantages including the ability to leverage the object oriented features of generalization and composition to simplify pattern specifications, the ability to use the class namespaces to specify pattern families, the ability to be a context for pattern invariant constraints, and the ability to create pattern instances 16 and perform their role binding by creating instances of the pattern meta-class and assigning values to their structural features (versus defining a separate structure for mapping roles to their values). EPatterns have two derived reference collections: a collection of roles (a subset of its eStructuralFeatures collection) and a collection of constraints (subset of its eOperations collection). It also defines two new containment collections: a collection of connectors and an "ordered" collection of ports. The order in the latter collection can be used by a pattern author to control the sequence of role traversal in a detection algorithm.

In the example (FIGS. 7 and 8), the composite pattern 71 is represented by an EPattern instance 16, a pattern meta-class at level M2.

ERole 46 subclasses EReference 24 and represents a role in a pattern 14. ERole 46 inherits the name, multiplicity and type features of EReference. These features are used to indicate the pattern role's name, multiplicity and type, which is usually an EClass 25 from the target semantic domain of an EPattern 45 representing a composed pattern. ERole 46 adds to EReference the ability to be connectable, through eSourceConnectors and ETargetConnectors collections, and constrainable through an eConstraints collection.

Thus, representing a role as a reference helps characterize (using name, type and multiplicity features of EReference) M1 instances that play that role in a pattern instance 16. A role can be typed through its inherited Type feature (by ERole 46 from EReference 24 in FIG. 2) with an instance of EClass 25 (M2 level) from the pattern's target meta-model 14 which represents the type of elements that can play that role. To implement pattern composition, a role's containment feature can be set to true and its eType set to an instance of EPattern 45 (which subclasses EClass 25), representing the composed pattern.

Additionally, the inherited multiplicity features of a role, namely lowerbounds and upperBounds, allows for the specification of some common role semantics. For instance, a lowerbounds value of 0 (e.g., leaf 35) specifies an optional role, whereas a value of 1 (e.g. component) specifies a required role. Similarly, an upperBounds value of 1 specifies a singular role (e.g., composite) and a value of −1 or * (e.g., leaf 35) specifies a collection role (can be bound to more than one element).

Yet another major advantage of this role representation is simplifying role binding down to simply assigning a value (the element to bind) to a feature (the role to be bound to) in a pattern instance 16. This is in contrast to prior art where a pattern instance is represented by a separate structure containing a map from roles to their bound elements. One more advantage is the ability to reference roles in a pattern's constraint just as regular features of the constraint's context (which is a pattern instance 16 at level M1). A role has an "ordered" collection of constraints that are attached to it, as explained later. The order of those constraints can be specified by the pattern author to control the order of constraint validation in the pattern detection algorithm.

Moreover, roles are connectable, i.e., a role can be connected to other related roles in the pattern 14 to formalize their relationship, as described below. Also, the collection of role's connectors is "ordered", giving the pattern author finer control over the order of connector traversal in the detection algorithm from a given role. Finally, a role can have an optional EPort 48 instance attached to it through the ePort feature. Only key roles of the pattern have ports.

In the example of FIGS. 7 and 8, the main identified roles (component 733, composite 737, leaf 735 and compose 739) are all represented by instances of ERole 46. The role 'component' 733 has an eType set to the 'Interface' metaclass and its lowerbounds and upperBounds both set to 1. The role 'composite' 737 has an eType set to the 'Class' metaclass and its lowerBounds an upperBounds both set to 1. The 'leaf' role 735 has an eType set to the 'Class' metaclass, its lowerbound set to 0 and its upperBounds set to *. The 'compose' role 739 has its eType set to the 'Operation' metaclass and its lowerbounds and upperBounds both set to 1. Each of these roles is simple and not composed.

> EConnector 47 subclasses EModelElement 30 (FIG. 4b) and represents a connector (or relationship) between two pattern roles. EConnector 47 defines an eSourceRole and an eTargetRole features representing the source and target roles it is connecting. It also defines two optional features, eSourcePort and eTargetPort, representing ports on the source and target roles, respectively, in case they represent instances of composed patterns. In addition, EConnector 47 has an eTypeReference feature, representing an EReference 24 from the target semantic domain that defines the relationship between the types of the two connector ends. Finally, EConnector 47 has an eTypeDirection feature which is an enumeration with 'Forward' and 'Reverse' values, indicating whether the connector's source end is related to its target end through the eReferenceType in the forward or reverse direction.

Restated, an EPattern 45 has a collection of EConnectors 47. A connector between two roles characterizes through its eType features a relationship between M1 model elements bound to the two roles in a pattern instance 16. The eType feature points to an EReference 24 instance that represents a directed relationship between the two EClass 25 instances from the meta-model that type the connected roles. Since it is directed, a connector specifies which of its ends represents the source and which represents the target of the reference through its eSourceRole and eTargetRole features. If one or both roles happen to represent a composed pattern (i.e. typed with EPattern 45), the connector also specifies which port (refer to the EPort meta-class defined below) instance belonging to the composed pattern it is connecting to through the eSourcePort and eTargetPort features.

Figure 6:
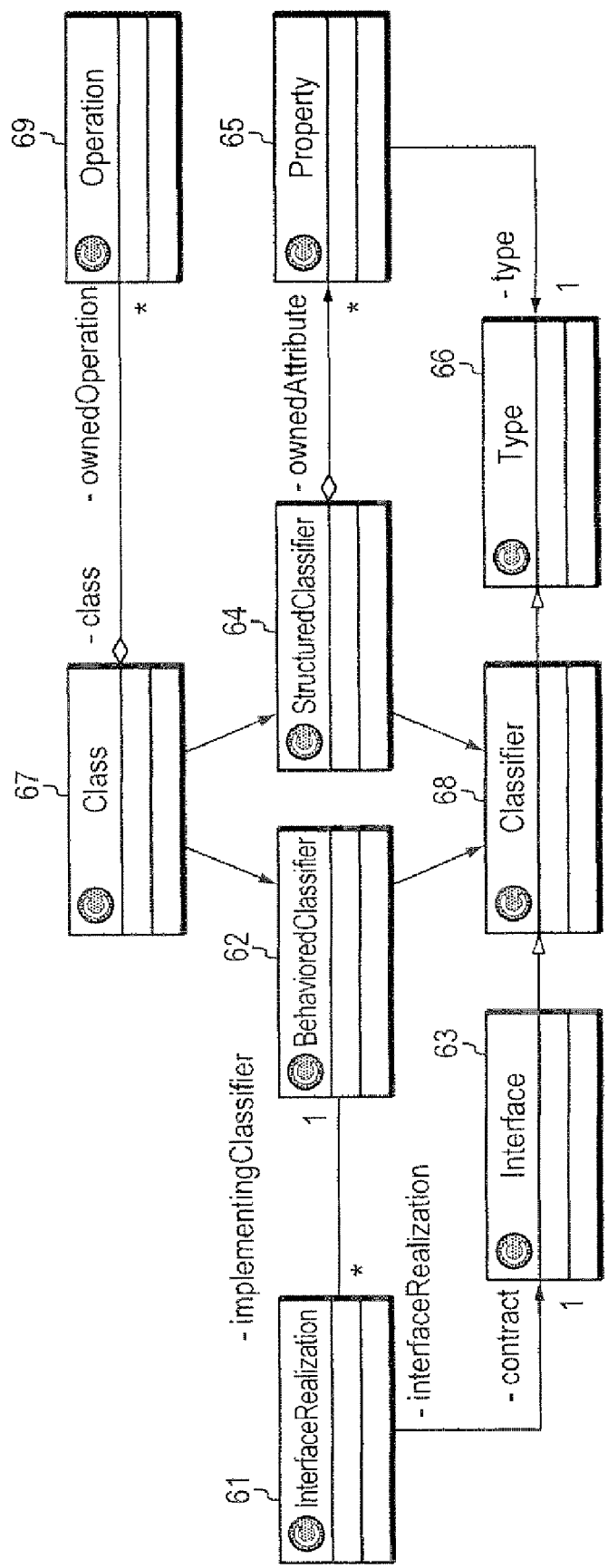
FIG. 6 is a diagram of a partial, simplified UML 2.0 meta-model.

Note that two eRole instances can only be connected to one another by an eConnector if the elements that the two eroles are bound to in the target model share an association. In other words, an eConnector relates two eRoles that are bound to elements in the target model that share an association. For instance, referring to the UML 2.0 metamodel in FIG. 6, a connector can be created between two roles bound to classes Class and InterfaceRealization since those two classes share an association. However, no connector is possible between two roles bound to classes Class and Interface since these two classes do not share any association in the target model (FIG. 6).

Another characteristic of a connector is traversability; that is the ability to traverse from one end of a connector to the other. By traversing here Applicant means the use of a connector's eType reference to run a query on a model element bound to one role of a connector to get a collection of one or more candidate elements for binding to the other role. Based on this definition, a connector is traversable in one direction if one of the following is true. 1) the direction is from the source of the connector to its target 2) the direction is form the target of the connector to its source where the eType of the connector has an eOpposite reference (i.e. the relationship is bidirectional), and 3) the direction is from the target of the connector to it source where the eType of the connector has no eOpposite reference (i.e. the relationship is unidirectional) but there exists another way to derive the required information (like a reverse reference cache).

In the example, various connectors 72, 74, 76, 78 are represented by instances of EConnector 47. In particular, one connector 74b is from composite 737 to component 733 representing an implementation 714a. Another connector 74a is from leaf 735 to component 733 representing an implementation 714a. Connector 76 is from composite 737 to component 733 representing a composition 714b. Unlike the foregoing connectors, connector 78 is from composite 737 to compose 739 representing an owned operation and is typed with the 'ownedOperation' EReference 24 from the UML meta-model. The other connectors represent relationships that do not correspond to direct EReferences 24.

> EPort 48: subclasses ETypedElement 129 and represents an interaction point between a pattern and its internal structure (its roles) and between a pattern and its surrounding environment (roles of composing patterns). An EPattern 45 has a ordered collection of EPorts 48. Ports are necessary for pattern composition since they expose the public roles of the pattern for connection to roles of composing patterns. The other roles of the pattern that are not connected to ports are considered private, i.e. not available for connection to roles of composing patterns (although they are still accessible through constraints). A pattern is composed when it is set as a type for a role of another pattern, called the composing pattern. Connecting roles of a composing pattern to a role representing a composed pattern can only be done through that composed pattern's ports. A role is made public when it is deemed by the pattern author as a key role that characterizes the pattern. Such a role must have a multiplicity of 1 and is usually one that is centrally connected to other roles. It is possible for a pattern to have more than one public role (hence port) depending on whether all roles can be reached by connectors from that role. The rule here is that every role has to be reachable by connectors from at least one public port. For a pattern to be composed, all of its ports must be connected to in the context of the composing pattern.

An instance of EPort 48 connects (through its eDelegatingRole feature) to an instance of ERole 46 for each role that is considered public in a pattern. In the special case where a public role also represents a composed pattern, the EPort 48 instance also specifies which port of the composed pattern it is connected to (through its eDelegatingPort feature). Furthermore, In the context of a composing pattern, an EConnector 47 instance that has any of its connected roles typed by an EPattern 45 instance has to also specify the EPort 48 instance it is connected to in that EPattern (through the eSourcePort and eTargetPort features).

As EPort 48 subclasses ETypedElement 129, it inherits its name, eType and multiplicity features. Both the eType and multiplicity of an EPort 48 instance have to match those of its eDelegatingRole (or those of its eDelegatingPort if it is specified). Since a public port must have a multiplicity of 1, a port always has its multiplicity set to 1.

In the pattern example of FIGS. 7 and 8, the composite role 737 characterizes the pattern 71, has a multiplicity of 1 and is centrally connected to other roles in the pattern. The other roles either do not characterize the pattern (e.g. component 733), are not centrally connected (e.g. compose 739) or do not have a multiplicity of one (e.g. leaf 735). Therefore, an instance of EPort 48 is specified only for the composite role 737 and is named compositePort 710.

EConstraint 49 subclasses EOperation 20 and represents a well-formedness constraint (a semantic rule) for a pattern 14. An EPattern 45 has a collection of EConstraints 49. An EConstraint 49 is attached to a particular pattern role through its eConstrainedRole feature. EConstraint 49 is usually a Boolean operation with a body that asserts a certain property about the pattern role it is associated with. However, for pattern roles whose multiplicities are many, EConstraint 49 could also be an operation returning a filtered collection of valid instances fulfilling some properties for these roles.

Thus, a constraint has a Boolean expression that is specified in a constraint language like EMOF OCL. The context of the constraint is nothing but an instance 16 of a pattern, which makes pattern roles accessible in the expression as regular structural features of the context. This has the added advantage of being able to specify constraints between one or more pattern roles. To formalize the relationship, an instance of EConstraint 49 explicitly references (through its eConstrainedRoles collection) the instances of ERole 46 that it is constraining. This helps a detection algorithm determine the earliest time to validate this constraint (basically as soon as all constrained roles have been bound), saving valuable time if such a constraint is determined not to hold early on. Otherwise, this information is hard to infer from the constraint's expression.

In the example, two constraints 712a, b can be specified with instances of EConstraint 49. The first one 712a is asserting that the association between the composite and the component roles 737, 733 is really a 'composition' and that it has a 'many' multiplicity. The second constraint 712b is asserting that an operation botmud to the compose role 739 has exactly one parameter whose type matches the interface of the component role 733.

EAssociation 44 subclasses EClass 25 and represents a new derived relationship between two EClass 25 instances from the pattern's target meta-model (target domain). As already discussed above for EConnectors 47, a constraint exists on the relationship that can be specified using a connector. An EAssociation 44 is a way to alleviate this constraint. Specifically, an EAssociation 44 adds a direct association between two elements in the target metamodel that do not originally have such a direct association. Thanks to this addition, two roles that originally could not be connected now can.

Accordingly, by defining EAssociations 44, one simplifies pattern specification by introducing high level relationships that can be specified between pattern roles. Without this concept, only low level relationships represented by EReferences 24 from the meta-model can be used between roles. A problem can occur when no direct EReferences 24 exist between EClass 25 instances in the meta-model that are types of related roles. In this case, a pattern author would need to work around that by introducing a set of intermediary roles increasing the complexity of the specification.

As such, an EAssociation 44 is effectively a namespace that defines two association ends (refer to EAssociationEnd meta-class defined below). These ends characterize a new relationship between two EClass 25 instances from the target meta-model. An EAssociation 44 is the container of the two AssociationEnd (subclass of EReference 24) and hence has to subclass EClass 25 (Ecore restriction).

In the example, two instances of EAssociation 44 are specified as they represent high level relationships that are used by the composite pattern 71 but do not map to direct EReferences 24 in the Ecore UML meta-model 21. The first EAssociation instance 714a is the 'Implementation' relationship between the composite role 737 and the component role 733 and between the leaf role 735 and the component role 733 (bound to classes Class and Interface that do not share any association in the UML meta-model). The second EAssociation instance 714b is the 'Composition' relationship between the composite 737 and component 733 roles.

EAssociationEnd 42 subclasses EReference 24 and represents one end in an EAssociation 44. Representing an end as a reference makes it straightforward to use as a type for EConnectors 47 in pattern specifications. The instance of an AssociationEnd is used as a value for the EConnector's eTypeReference feature. An EAssociationEnd 42 inherits the name, multiplicity and type features of EReference 24. These features are used to indicate the association end's name, multiplicity and type. Thus the EAssociationEnd 42 is typed with an EClass 25 instance from the target meta-model (target domain).

Each instance of EAssociationEnd 42 has a boolean 'navigable' feature that specifies whether the EAssociation is directed towards that end. At least one end in an EAssociation has to be navigable for the association to be relevant. When both ends are navigable, the association becomes bidirectional. If an end's EAssociation 44 is bidirectional, its opposite EReference 24 (eOppositeEnd reference) is set to the other EAssociationEnd 42 in the same association.

One main difference between EReference 24 and EAssociationEnd 42 is that the former is owned by an EClass 25 representing one end of a relationship and typed with the other, while the latter is always owned by an EAssociationi 44 and the two associated EClasses 25 are derived from the types of both ends of the association. Thus, unlike an EReference 24 whose value can be accessed with a simple getter, every one of the two ends of an association is accessed with a getter that takes an instance of the other association end's type as a parameter and derives the return value from it. As such, an end represents a derived reference, and hence has a derivation expression specified in a language like EMOF OCL. The type of the expression is the same as that of the end and the context of the expression is an instance of the type of the opposite end.

Also unlike EReferences 24 that are created in the eStructuralFeatures collection, EAssociationEnds 42 are created in the EAssociation's 44 eAssociationEnd collection.

In the example of FIGS. 7 and 8, the 'Implementation' association 714a is bidirectional and has two EAssociationEnd 42 instances (named 'implementedInterface' and 'implementedClassifier') typed with 'BehavioredClassifier' and 'Interface' from the UML meta-model. Each has multiplicity *. Also, the 'Composition' association 714b has two EAssociationEnd 42 instances (namely, 'composingClassifier' and 'composedtype') typed with 'StructuredClassifier' and 'Type' from the UML meta-model. Both have multiplicity *.

Notation

The notation for Epattern 12 is based on the notation of the class and composite structure diagrams of UML 2.0. This makes it easier to leverage already existing UML tools in pattern specification. Table 1 below illustrates this notation.

Specification Process

Figure 5:
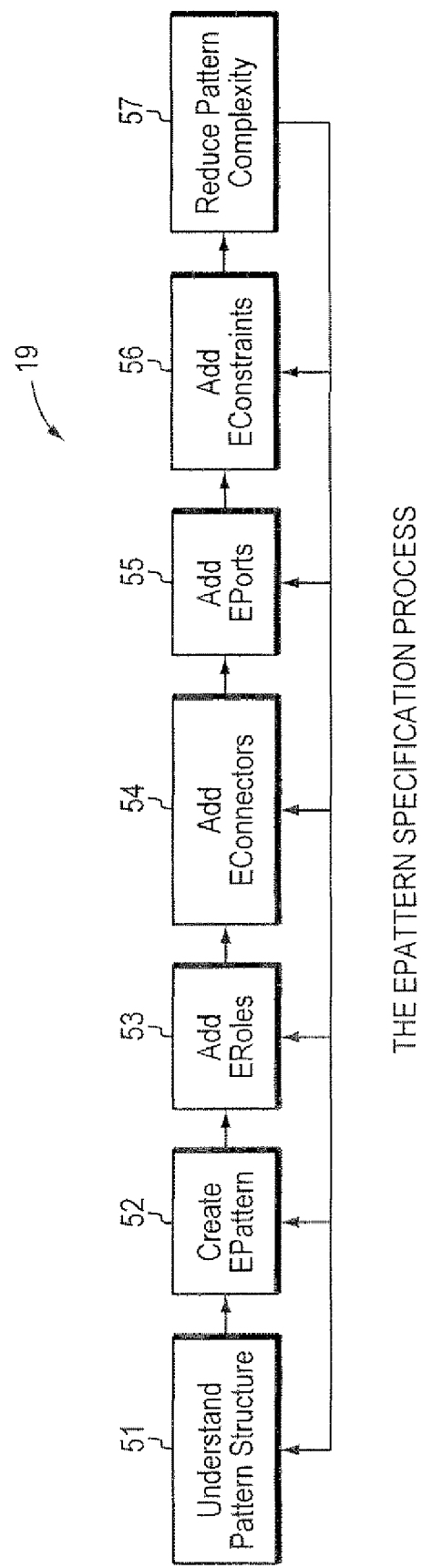
FIG. 5 is a flow diagram of the Epattern specification process.

Applicant proposes a recommended iterative specification process 19 for using the Epattern language 12. The outcome of this process 19 is a formal pattern specification. The process 19 is depicted in FIG. 5 and explained in the following suggested order of steps. In practice, a pattern author may move from any step to any other step in an iterative fashion. The composite pattern 71 example of FIGS. 7 and 8 is used to illustrate the process 19 and the notation provided above.

With reference to the Understand Pattern Structure step 511 before a pattern 14 is specified with Epattern 12, there has to be a good understanding of its structure. A pattern's structure is a set of roles, typed with M2 meta-classes from a target meta-model and related to each other through meta-refer-

TABLE 1

Epattern notation

| | |
|---|---|
| EPattern 45: a frame with a name compartment and a structure compartment showing the pattern's structure. The name compartment shows the fully qualified name of the pattern (including its namespace). | 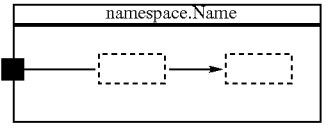 |
| ERole 46: a box containing a compartment that shows the role's name, type and multiplicity (if different from [1 . . . 1]). The box is solid (top role in figure) with a structure compartment if the role represents a pattern composition and dashed otherwise (bottom role in figure). | 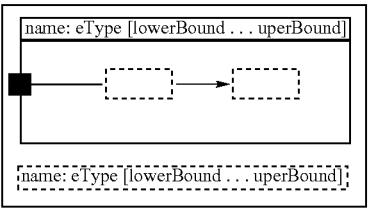 |
| EPort 48: a small filled box on the frame of the structure compartment. The box has a floating name label that shows the name and type of the port. The box is either connected directly to a delegating role (left port in figure) or to a delegating role's port if the role represents a composed pattern (right port in figure). The port also has a little box showing the order of the port in the pattern's ePorts collection. |  |
| EConstraint 49: a sticky note with a name compartment and an expression compartment. The note is connected to the constrained roles with a dashed connector. The role end of the connector has a little box showing the order of the constraint in the role's eConstraints collection | 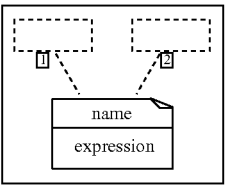 |
| EConnector 47: a directed arrow that goes from the source role to the target role. If a connector has a source/target port, the line connects that port on the corresponding role (e.g., source port in the figure). The connector has floating labels showing the connector's eType and its opposite (if any). It also has a little box showing the order of the connector in the attached role's eConnectors collection | 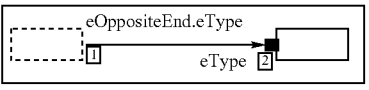 |
| EAssociation 44: a line connecting two EClass instances from the pattern target language meta-model. The line has a floating name label, two floating end name labels, and two floating end multiplicity labels. The line can be shown as an arrow if the association is directed. | 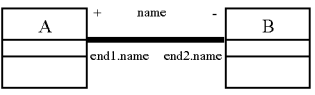 | ences. In the example, the target meta-model is UML, 2.0, simplified in FIG. 6 for the purposes of illustration.

The class diagram in FIGS. 7 and 8 reveals the following roles: component 733 of type 'Interface' 63, composite 737 and leaf 735 of type 'Class' 67 and compose 739 of type 'Operation' 69. The relationships between these roles include an 'implementation' 714a between leaf 735 and component 733 and between composite 37 and component 733, which is realized by an element 61 of type 'InterfaceRealization' (meta-class in FIG. 6). The element 61 is related to the interface 63 by the meta-reference 'InterfaceRealization contract' and to the class 67 by the meta-reference 'BehavioredClassifierInterfaceRealization'. The syntax for meta-reference 'X.Y' refers to an EReference named Y in an EClass named X. BehavioredClassifier 67 and StructuredClassifier 64 are two illustrated classes 67. Another relationship is 'composition' between composite 737 and component 733, which is realized by an element 65 of type 'Property'. The element 65 is related to the class 67 by the meta-reference 'StructuredClassifier.ownedAttribute' and to the interface 63 by the meta-reference 'Property.type'. Type element 66 is a classifier 68. Finally, composite 737 is related to compose 739 directly by meta-reference 'Class.ownedOperation'.

Next is the Create EPattern step 52 (FIG. 5). Once there is a good understanding of the pattern's structure, the pattern 14 call be specified using the Epattern 12 meta-model (M3 level). The first step is to create (or find if one already exists) a suitable pattern catalogue (instance of ECatalogue 140) to hold the pattern specification. After that, an instance of EPattern 45 is created in the sub-catalogue and named. The instance is given a name representing the pattern 14. In the FIGS. 7 and 8 example, an instance 71 is created and named 'CompositePattern'. A complete Epattern specification of this pattern (instance 71 of EPattern 45) is shown and described in FIGS. 7 and 8.

Continuing with FIG. 5, the Add ERoles step 53 is next. Once an Epattern 45 instance is created, every pattern roles identified in step 51 is modeled by an instance of ERole 46 in the pattern's eRoles collection. Each ERole instance is given the name of the role, and typed, through its eReferenceType feature, with an EClass 25 instance representing the type of the role in the target meta-model. If the role represents a composed pattern, it is typed with an EPattern 45 instance instead, and its containment feature is set to true (inherited from EReference 24). The role's multiplicity in turn is set according to whether the role is optional/required and singular/many.

In addition to the main roles identified in step 51, some intermediary roles might be initially needed to allow the main roles to be connected by connectors typed only with EReferences 24 from the meta-model. Recall that two roles can only be connected with an EConnector 47 if the bound elements in the target model share an association.

In the example, ERole instances 733, 735, 737, 739 (FIG. 7) for the main roles (component 733, composite 737, leaf 735 and compose 739) identified in step 51 are created. In addition, based on the meta-model in FIG. 6, ERole instances for intermediary roles 73, 75, 77 are needed to connect the main roles. Two such instances typed with 'InterfaceRealization' are needed to represent the implementation relationship between the composite 737 and component 733 roles and between the leaf 735 and component 733 roles. The former role is a Class, the latter role is an Interface and those two meta-classes are related through InterfaceRealization 61 in FIG. 6. The corresponding ERole instances are named 'realization1' and 'realization2' at 73 and 75 in FIG. 7. For similar reasons, another ERole instance 77 typed with 'Property', and named 'children', is needed to represent the composition relationship between the composite 737 and component 733 roles. All of the role instances have their multiplicity set to '1 . . . 1' except for the leaf role 735, where it is set to indicating that the role is optional and represents a collection.

The next step after creating roles is connecting them by EConnector 47 instances (e.g., Add EConnectors step 54, FIG. 5). An instance is created in the pattern's eConnectors collection to specify every identified relationship in step 51 (and in previous specification phases) between pattern roles. Instances of source and target roles are assigned to the connector's eSourceRole and eTargetRole features. If one or both roles represent composed patterns, i.e., typed with EPattern 45, the connector's eSourcePort and/or eTargetPort features are also set to instances of EPort 48 owned by the composed EPattern 45. The connector's type is set to an EReference 24 from the target meta-model representing a directed relationship between the EClass 25 instances typing the connector's source and target roles (or ports if specified).

In the example, several connectors are specified using meta-references in FIG. 6. Namely, two connectors 72a, b are typed with 'InterfaceRealization.contract' from 'realization1' (instance 73) to component 733 and from 'realization2' (instance 75) to 'component' 733. Two connectors 74a, b are typed with 'BehavioredClassifier. interfaceRealization' from 'leaf' 735 to realization1 (instance 73) and from 'composite' 737 to 'realization2' (instance 75). A connector 76a is typed with 'StructuredClassifier.ownedAttribute' from 'composite' 737 to 'children' 77. Another connector 76b is typed with 'Property.type' from 'children' 77 to 'component' 733. Another connector 78 is typed with 'Class.ownedOperation' from 'composite' 737 to 'compose' 739.

After the connectors are specified, the order of these connectors can be set in each role's eConnectors collection. As previously mentioned, such order affect the generation of detection algorithms. FIGS. 7 and 8 show the composite pattern specification with the connectors added along with their orders showing in small boxes at the connector ends.

Continuing with FIG. 5, the Add EPorts step 55 is next. Once the basic pattern structure is specified, ports are added to expose some roles that are considered public. For each such port, an instance of EPort 48 is added to the pattern's ePorts collection. Each EPort 48 instance is connected to a role through its eDelegatingRole feature. If the role represents a composed pattern, i.e., typed with EPattern 45, the instance's eDelegatingPort feature is also set to an EPort 48 instance owned by the composed pattern. Then the port is given a name that correlates to its connected role and is typed with the same type as the port's eDelegatingRole (or EDelegating port if specified). The port is inserted in the pattern's ePorts collection in the desired index. The the example shown in FIGS. 7 and 8, one port 710 is specified and connected to 'composite' role 737. The port is named 'compositePort' 710 and typed with the 'Class' meta-class. As shown in FIGS. 7 and 8, a small box over the port indicates '1' which is the order of the port.

Once pattern roles have been specified, well-formedness constraints are added for those roles at Add EConstraints step 56 (FIG. 5). Each constraint is represented by an instance of EConstraint 49 in the pattern's ordered eConstraints collection. A constraint is given a name and a boolean expression, specified in the context of an instance of the pattern using a constraint language. The constraint's eConstrainedRoles feature is then set to the ERole 46 instances constrained by the constraint.

The pattern author can set the order of the constraint by inserting it in the required index in the eConstraints collection (which affects the order of constraints checked in the detection algorithm). That collection is bidirectional, which means as soon as a constraint is inserted; the constrained role is added to that constraint's eConstrainedRoles collection.

In the example, two constraints 712a, b are specified. The first constraint 712a is named 'composition' and connected to the 'children' role 77, and is specified in OCL as follows: 'children.aggregation=AggregationKind.Composite and children.upperfound=–1' (the second conjunct specifies a 'many' multiplicity). The second constraint 712b is named 'parameter' and connected to both 'component' role 733 and 'compose' role 739. Constraint 712b is specified in OCL as: 'compose.ownedParameter->size( )=1 and compose.ownedParameter->at(1).IsoclOfKind(component)'. FIGS. 7 and 8 show the constraints respective orders as indicated in numbered small boxes at the role end of the constraint attachments.

At step 57 in FIG. 5, the present invention pattern specifications can get large and complex. Various features are provided in Epattern 12 to manage this complexity including specifying patterns by inheritance and pattern composition, refactoring common constraint logic in operations and eliminating intermediary roles through derived associations. Other object-oriented scalability features are suitable including pattern generalization, refinement, the ability to make patterns as templates, and the ability to refactor common constraint logic into operations.

Recall that an EFAssociation 44 allows the designer to directly (no intermediate role) connect two roles with an EConnector 47 that could not otherwise be connected to each other because the elements they are bound to do not originally share an association. Intermediate roles and connectors can then be replaced by one connector, thanks to the added association (an instance of EAssociation 44), thus resulting in a simplified pattern specification.

Specifically, an instance of EAssociation 44 is created in an ECatalog 140 and given a name corresponding to the represented relationship. After that, two instances of EAssociationEnd are created in the association's eAssociationEnd collection. Every such instance is typed with an EClass 25 from the target metamodel and given a name that corresponds to the role played by that end of the association. The end's multiplicity is then specified along with its navigable feature. At least one end of an EAssociation has to be navigable (otherwise the EAssociation is meaningless). Every navigable end represents a new derived directed relationship from the end's type to the other end's type. A navigable end gets a derivation expression in a language like EMOF OCL to derive M1 instances conforming to an end's type from the context of an instance conforming to the other ends's type. Non-navigable ends do not get derivation expressions. If both ends are navigable, they reference each other through their eOppositeEnd feature. Once the ends are specified, complex pattern specifications can be refactored by deleting temporary roles and using the EAssociationEnds 42 (instead of EReferences 24) to type connectors.

In the example of FIGS. 7 and 8, two instances of EAssociation 44 are specified. The first instance 714a is named 'Implementation' between EClass 25 instances 'BehavioredClassifier' and 'Interface'. 'Implementation' 714a is used to type a connector directly from 'compose' role 739 to component role 733 or from 'leaf' role 735 to 'component' role 733. The second EAssociation instance 714b is named 'Composition' between EClass 25 instances 'StructuredClassifier' and 'Type'. This EAssociation 714b is used to type a connector from 'composite' 737 to 'component' 733. The simplified pattern specification illustrates these instances 714a, b of EAssociation 44 at the bottom of FIG. 8. This part of the figure also shows the specification of the two derived associations ('StructuredClassifier' derived from 'composingClassifier' and 'BehavioredClassifier' derived from 'implementingClassifier'). Now class Class has an association (inherited from BehavioredClassifier) with class Interface and one can create a connector between leaf roles 735 and component 733 and between composite role 737 and component 733. Similarly, one can create a connector between roles composite 737 and component 733 describing the composition.

Further example processes of pattern modeling with invention Epattern 12 are given in U.S. patent application Ser. No. 11/563,346, filed on Nov. 27, 2006, entitled "Computer Method and System for Pattern Specification Using Meta-Model of a Target Domain" herein incorporated by reference.

Once a pattern specification in Epattern 12 has been authored, the present invention enables a detection strategy to be defined. The strategy (detection method, means and the like) can either be interpreted from the specification at runtime, or it can be processed for code generation. While the former approach is more applicable for simpler patterns, the latter is more extensible and more efficient since part of the strategy's logic would have been performed in the code generation step.

Basic Pattern Detection

The present invention pattern detection system and method is based on an algorithm that takes a structured model as an input and returns a collection of detected pattern instances as output. A pattern in Epattern is represented by a class (EPattern) 45, and a pattern role is represented by a property (ERole 46) of the class. Therefore, a pattern instance 16 can be specified by an EObject (of the EPattern class) and a role binding is specified by a value or the role property.

An EPattern 45 represents a graph whose nodes are constrained pattern roles and whose edges are relationships between these roles. A structured model is also a graph whose nodes represent model elements and whose edges represent containment and/or reference relationships between these elements. The pattern detection strategy of the present invention is then a graph matching algorithm (process) that tries to bind every role to a model element. The details of such an algorithm and the invention detection system and method are summarized as follows.

Take as Input and Return as Output

Pattern detection of the present invention needs as input the definition of the pattern it is detecting and the input model to inspect. The output of the invention detector is a collection of detected pattern instances 16.

The invention detector 100 starts at an input port of the pattern being detected. An input port is a port that has its 'input' property set to true and always delegates to a defining role of the pattern, which becomes the first role to bind. In the case of multiple input ports the user has to specify which port to use as the starting point or the detector 100. Otherwise the detector can default to the single available port.

Do at Every Role

Two parameters are available to the detector 100 at every role: a context pattern instance having the previous role bindings so far, and a collection of candidate bindings for the current role. The basic logic is to check whether the candidates satisfy the constraints of the role and if they do then bind the candidates to the role and the resulting pattern instance moves to the next role. Otherwise the pattern instance gets discarded. A pattern role can have the following constraints:

A base type constraint: specified as the type of the ERole 46. When such a constraint is specified, an object matching this role has to have a type that conforms to that base type.

A multiple constraint: specified as the UpperBound of the ERole 46. The upper bound can have a value of 1 or *, indicating whether a role is singular or a collection. If a role is singular every binding occurs in a separate instance; otherwise all bindings occur to the role in the same instance.

Other constraints: specified as a collection of references to EConstraints 49 that are owned by the defining EPattern 45. An EConstraint 49 is basically an operation whose body represents an arbitrary constraint in some constraint language. Two types of constraints are available: those whose return type is Boolean, representing a true/false expression; and those that have return types that are similar to their roles' base types, representing filter expressions that filter away non-conforming bindings and keep good ones.

These constraints need to be checked in a certain order. First, the base type constraint is checked. Next, the multiplicity constraint is used to either create a clone instance for every binding if the role is singular, or to store all the bindings in the passed instance if the role is a collection. Then every pattern instance 16 is checked against the other constraints, in the order they are specified in the reference collection, to determine whether they are satisfied. Any pattern instance 16 that passes all constraints is passed to the next connector if any, otherwise it gets discarded. The return result is a collection of completed pattern instances 16.

Traverse Connectors

With respect to order of traversing connectors, various strategies can be chosen for the next connector to traverse after each role. A simple proposition here is to use a depth first strategy; i.e. to always choose an outgoing connector of the currently visited role. The order of choosing that connector is the same as its order in the role's source connectors collection.

A connector, defined by EConnector 47, represents a directed relationship between two roles, namely a source and a target. A connector also has a type, represented by an EReference 24 and a direction (Forward or Reverse) that describes the exact relationship between the source and the target roles. A pattern instance 16 is available to the detector 100 as a context when traversing a connector. The detector 100 starts by extracting the source element from the passed pattern instance and uses the connector's type information (data) to get the collection of target elements. If the target element is not already bound in the context instance, the detector 100 passes the target elements as the collection of candidate bindings to the target role. Otherwise the detector 100 asserts that those elements are a subset of the bindings already there for the target role. If no targets are found or they are not a subset of existing bindings, the detector 100 returns an empty collection of pattern instances 16.

Detection Configuration

From the description of the basic detection strategy (system and method 100), three configuration parameters control the efficiency:

Input Port: used to identify the starting point of the detector algorithm 100

Order of Constraints: used to control the checking sequence of constraints

Order of Connectors: used to control the binding sequence of roles.

Many advanced features of Epattern 12 can be leveraged by the invention detector 100 as follows:

Pattern Composition

Pattern composition is used to reduce the complexity of pattern definitions by having one pattern composing others. Pattern composition is realized by having roles typed with EPatterns 45 rather than EClasses 25. One difference to a detection algorithm (method) is that the candidate bindings of such roles are not model elements but pattern instances 16. Another difference is that connectors connecting such roles need to process more information like source or target ports. A model element needs to be extracted from the output port of the source pattern instance 16. Also, a candidate pattern instance 16 needs to be detected given the target model element from the input port of the target role.

Pattern Inheritance

Patterns, defined as classes, can be organized into inheritance hierarchies with more concrete patterns extending more abstract ones. One striking advantage is that the structure of the abstract pattern is also inherited in the context of the concrete one, along with all the detection semantics already specified like input ports and constraint and connector orders. New elements defined in the concrete pattern will augment the ones in the abstract pattern without repetition. In some embodiments, the invention detector 100 looks at the combined semantics of both the abstract and the concrete pattern to determine its logic.

Pattern Refinement

Pattern refinement is an incremental feature on top of pattern inheritance where certain aspects of the abstract pattern can be changed (or refined) in the concrete pattern. Examples of these aspects include a role's base type, a connector's type, a connector's order, a constraint's order and a delegation target for ports. With respect to a refined pattern, embodiments of the invention detector 100 take care of incorporating these changes in the abstract pattern definition.

Pattern Genericity

Often enough a pattern definition includes literal values (Strings, Integers . . . etc) that do not need to be fixed in stone but should rather be left up to the user to specify, probably with defaults. One way to handle this is to model literal values as EAttributes 22 of the EPattern 45 and then reference the attributes instead of the literal values, effectively achieving pattern genericity. Values for these attributes can be specified for the pattern to be detected to control the detection logic.

Multiple Pattern Input Ports

In the case of one input port to the subject pattern 16, the next step to perform after each one of the regular steps (role binding, constraint checking and connector traversing) is easily determined. However, when multiple input ports are available, the situation gets more complicated. For the detector 100 to determine the next step, it needs to remember the input port used to start the detection process (session) and use it (the starting input port) to switch on the next step to do.

Minimum Multiplicity of Roles

So far, only maximum role multiplicity is discussed in the invention detection process 100. However, minimum multiplicity or lower bound of a role can also have an impact of a detection algorithm (process). Lower bounds in Epattern 12 are allowed to take the values of '0' and '1'. A value of '1' is the default and it specifies that the role is required. On the other hand, a value of '0' means that a role is optional. A detector 100 of the present invention handles optional roles by considering two cases for the next connector from a given role. One case is the usual one based on connector ordering;

the other one is the next connector after ignoring all connectors that extend off the optional role down its hierarchy.

Role Pre-Binding

In most cases, the detector 100 starts the search or pattern instances 16 with no predetermined binding for roles. However, sometimes a user may decide to fix some role bindings to speed up the detection by effectively reducing the search space. A simple way to support this feature is to add one more parameter to the detector input, namely specify a pattern instance that has all the predetermined bindings already set. The detector 100 uses that pattern instance 16 instead of an initially empty one. The logic of role binding is also changed to check if the role is already bound and hence only verify that the binding is one of the passed candidate elements before proceeding to the next connector.

Derived Association

As mentioned previously, connectors are typed by an EReference 24 from the domain meta-model. However, sometimes a connector does not represent a single reference between the source and the target roles but rather a sequence of them probably with special logic. That is why Epattern 12 has the concept of a derived association (EAssociation) 24 to allow a pattern author to create a new association in the pattern model that represent several associations in the domain meta-model. That association has two ends of type EAssociationEnd 42 which extends off EReference 24. Connectors then can be typed with EAssociationEnd 42 from the pattern model instead of a regular EReference 24. The detector (100?) needs to know how to invoke the derivation logic of an association end to get the target model elements from a source element.

Logical Constraint on Connectors

A definition of a simple pattern normally has no variation points. That is to say that all connectors are required. However, as the pattern gets more complex, a need for variation points becomes more pressing. That is why Epattern 12 has the concept of a logic constraint on connectors. An example of this is to specify that two connectors have an 'OR' logical relationship, indicating that either of them can proceed from a role. The detector 100 in this case considers possibly more than one next connector for every role whose connectors have logical relationships. Therefore, rather than having one sequence of steps to detect a pattern, the detector 100 preferably has a tree of steps with several branches.

UML2 Epattern Profile

A pattern definition can either be authored directly in Epattern 12 or in UML 2.0 and then converted to Epattern 12 as described in related U.S. application Ser. No. 11/563,346 filed on Nov. 27, 2006, entitled "Computer Method and System for Pattern Specification Using Meta-Model of a Target Domain". All of the semantics of Epattern 12 so far are importable from UML 2.0. However, some of the detection semantics defined for Epattern 12 do not have equivalents in UML 2.0, like the 'order' property for connectors and constraints. That is why an Epattern 12 profile needs to be defined or augmented to have stereotypes with tag definitions representing these missing semantics. For example, a stereotype (EConnector 47) for connectors and a similar one (EConstraint 49) for constraint both with an 'order' tag definition need to be added. Also, ports need to have a stereotype (EPort) that has a tag definition for the 'input' property.

The following describes details of a preferred embodiment of the present invention. However, the present invention is not limited to software or UML2 patterns but apply to patterns of any target domain that can be structurally described by a meta model (business process modeling, data modeling, CAD modeling . . . ).

Epattern Detector 100

A pattern specification, which is an instance of the Epattern 12 meta-model, is defined at the M2 level of the meta-modeling architecture. Therefore, an instance 16 of a pattern, where the pattern roles are bound to specific elements from the user model, is defined at the M1 level of the same architecture. Pattern instances are created by instantiating classes representing their types. Thus, to create a pattern instance 16, there has to be a class representing the pattern type to instantiate. The EMF framework provides facilities to generate java classes that correspond to types at the M2 level. The generation is done by mapping instances of the Ecore meta-model to equivalent java language constructs. The PMF framework extends this mapping to the Epattern meta-model 12 to generate Java classes that represent user-specified patterns.

Instances 16 of these pattern classes can then be used by algorithms derived from the same pattern specifications. For example, a pattern application algorithm takes a pattern instance 16, where role bindings are specified, and performs changes to the user model to make these roles conform to the pattern's structure. On the other hand, a pattern detection algorithm (process) performs the reverse operation. It takes a user model, tries to detect structures of elements inside it that match the pattern's structure, and uses the generated pattern classes to create pattern instances 16 (by instantiating objects of those classes) and specify their role bindings (by setting the values of the class attributes that correspond to pattern roles).

The below (a) discusses the extended mapping by PMF used to generate Java classes corresponding to pattern specifications (M2 level), (b) explains the steps of a detection algorithm (process) 100 that are derived from an EPattern 45 specification, and (c) elaborates on a new mapping by PMF used to generate a query class implementing a detection method and system from a pattern specification. These sections use the composite pattern example discussed in FIGS. 7-8 above for purposes of illustrating these aspects of the present invention.

Epattern to Java Mapping

Figure 9:
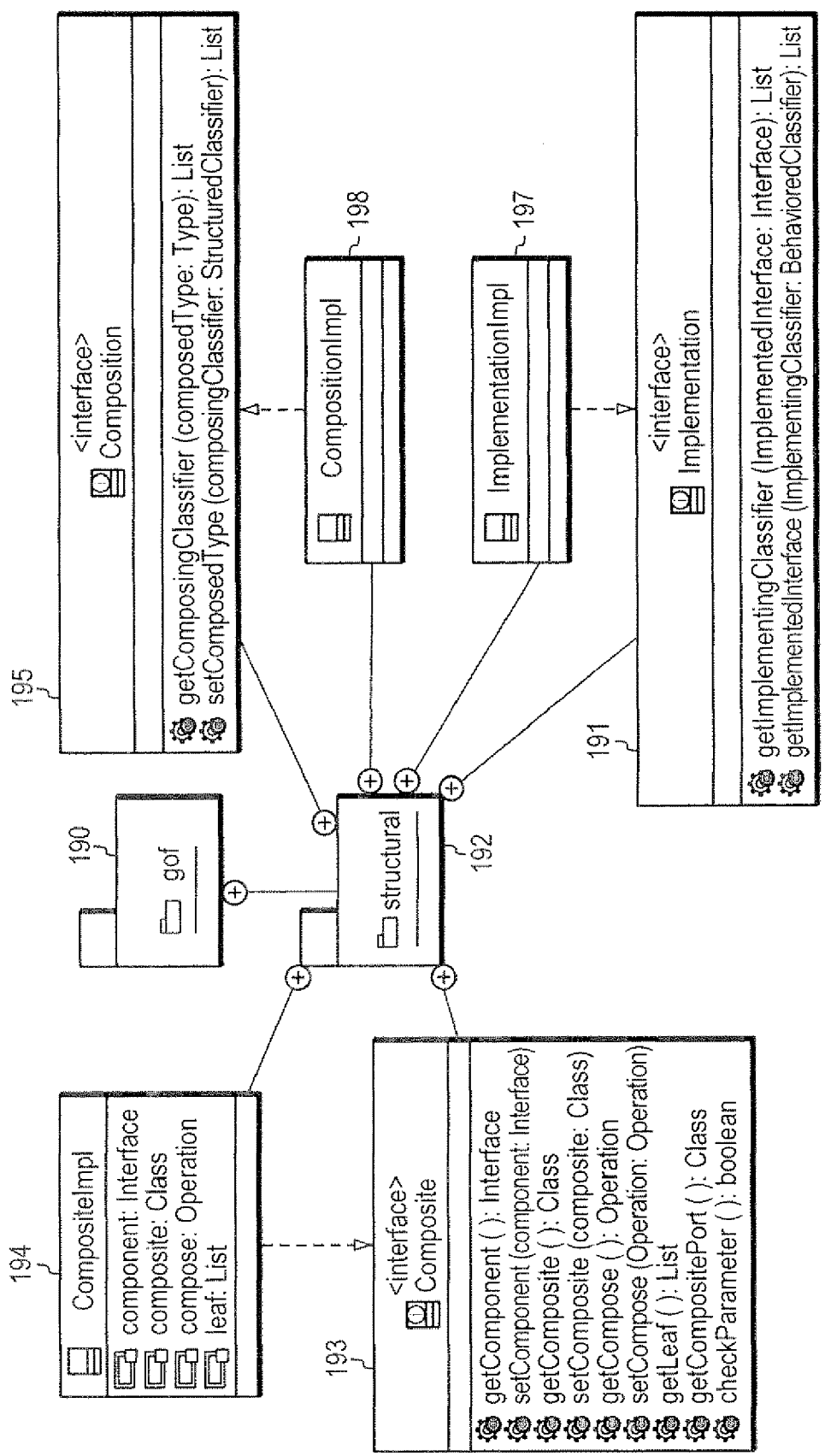
FIG. 9 is a diagram of the composite pattern classes and interfaces (i.e., generated Java artifacts) in embodiments of the present invention.

The EMF framework provides a mapping from Ecore to java, which is used to generate java code for the EClass instances defined in Ecore models. Since a pattern is specified as an EPattern 45, effectively a subclass of EClass 25, it enjoys all the code generation facilities provided by EMF for EClasses. PMF reuses and extends the mapping provided by EMF for mapping Epattern 12 to Java. The following items define the mapping from Epattern 12 to Java using the composite pattern specification in FIG. 8 as an example (the resulting java classes and interfaces are shown in FIG. 9)

An ECatalog 140 instance maps to a java package with the same name. The namespace of the java package corresponds to the one of the catalog (i.e., if the catalog is contained by another catalog, then the java package is also contained by the package that corresponds to that parent catalog). In the example, two java packages 190, 192 are created: the first is named "gof" and the other, created inside it, is named "structural" (i.e., with name space of "gof.structural").

An EPattern 45 instance maps to a Java interface with the same name as the instance and an implementation class that implements that interface.

In the example (FIGS. 7 and 8), the composite instance 71 of EPattern maps to 'Composite' interface 193 and 'CompositeImpl' class 194.

ERole 46 instance maps to an attribute in the pattern class with the same name. The type of the attribute matches that of the role except for roles with multiplicity 'many', where the type is a Java List interface. Corresponding getter and setter methods with corresponding names are added to the pattern interface/class. If the role's multiplicity is 'many', only a getter method is added since the List API returned by the getter can be used to change the role.

In the example, all four roles (component 733, composite 737, leaf 735 and compose 739) map to attributes in the class and getter and setter methods in both the class/interface. Notice that the 'leaf' role is mapped only to a getter method with type Java List since it has a 'many' multiplicity.

An EPort 48 instance maps to a getter method in the pattern interface and class. An EPort is defined as a "derived" and "un-settable" EReference, which means it does not get its own attribute in the class, it does not get a setter method, and the implementation is user defined. In this case, the implementation delegates to that of its delegating role/port. If the port delegates to a simple role, the implementation of the getter method calls the getter method of the port's eDelegatingRole in the same class. However, if the port delegates to a composed role (i.e., one typed with an EPattern 45 instance), the method also calls the getter method that corresponds to the port's eDelegatingPort on the instance returned by the role's getter.

In the example, two getter methods are defined in the interface/class corresponding to the two ports 'componentPort' and 'compositePort'. The implementation of the 'getComponentPort', for instance, calls the 'getcomponent ' method.

An EConstraint instance 49 maps to a Boolean method with the same name prefixed by 'check' in the pattern interface/class. The implementation is based on the constraint's language and the expression (attributes of the EConstraint class). If the language is OCL for example, the expression is sent to the EMOF OCL interpreter provided by EMF for execution and the result is returned. However, if the language is Java, a stub method is generated for the user to manually implement.

In the example, the 'checkParameter' method is generated for the 'parameter' constraint.

An EAssociation instance 44 maps to a java interface with the same name and a corresponding implementation class.

In the example, the two associations 714a, b map to the interfaces 'Implementation' 191 and 'Composition' 195 and map the classes 'ImplementationImpl' 197 and 'CompositionImpl' 198 as illustrated in FIG. 9.

An EAssociationEnd 42 instance (when navigable) maps to a getter method with the same name in the association interface/class that corresponds to the end's EAssociation 44. The method's return type corresponds to the type of the association end (or the Java List Interface if the end has a multiplicity of 'many'). It also takes a parameter whose type corresponds to the type of the other association end. The implementation of the method is based on the end's derivation language and expression. If OCL is used, the expression is sent to the OCL interpreter to execute. However, if the language is Java, a stub method is generated to be implemented manually.

In the example, all ends 42 ('implementingClassifier', 'implementedInterface', 'composingClassifier', and 'composedType') are navigable and thus each end is mapped to a respective getter method in its corresponding interface/class.

Epattern Query Class

The PMF framework allows for the generation of a detection algorithm (i.e., detector method and apparatus 100) that corresponds to each pattern specification. The goal of the invention detector 100 is to detect structures of elements in user models (level M1) that conform to the structure depicted by a pattern specification (M2). The detector 100 takes as input user models (having respective model elements) to detect patterns in and returns as output a collection of zero or more detected pattern instances. To accomplish that, the detector 100 navigates through the user model (a graph) guided by the structure of a pattern (another graph), making the process resemble graph matching algorithms. In the detection process of a given pattern, the control flow graph (CFG) is determined by certain semantics in the pattern specification. More specifically, the invention detector/detection process 100 uses a depth first strategy to traverse the pattern specification starting from a given port. Thus the chosen port in addition to the order of constraints and connectors at each role affects the CFG of the detection process.

The sequence of visiting graph nodes in a depth first strategy is affected by: 1) the order of nodes in the root collection and 2) the order of outgoing connectors from each node. The invention pattern detection 100 treats the pattern's ordered ePort collection to be the root collection of nodes, and each role's ordered collections of eConstraints and eConnectors to be the collection of outgoing connectors of a node. By specifying the order of these collections, a pattern author controls the CFG of the detection algorithm/process 100 (making it more efficient), without affecting the declarative nature of the pattern specification, which is an advantage of the present invention.

Figure 10:
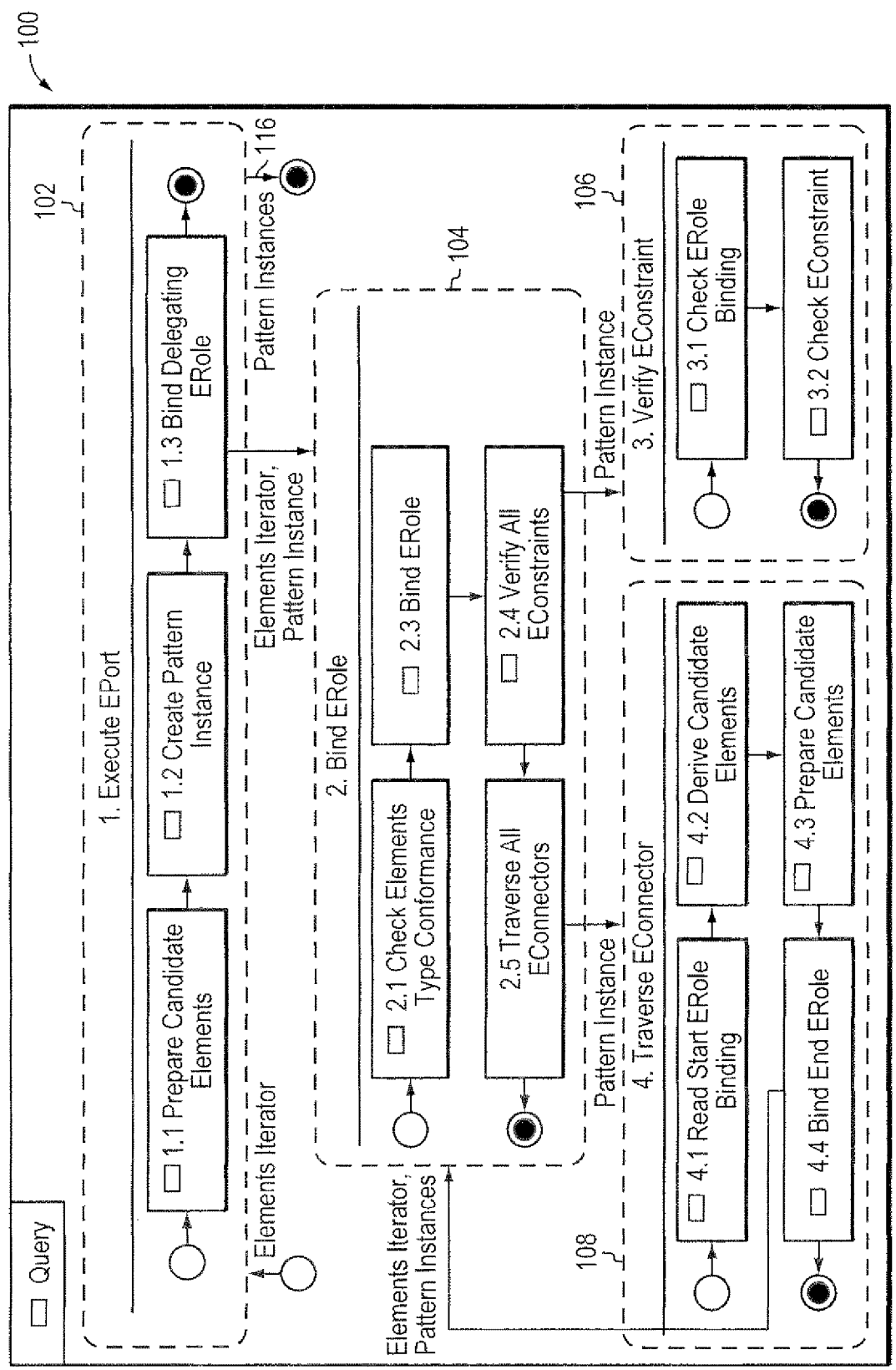
FIG. 10 is a high level activity diagram of the detection process in a preferred embodiment.

A high level activity diagram for the detection process (method) 100 of the preferred embodiment is shown in FIG. 10. For each pattern specification, the invention detection process or sequence 100 is implemented as a query class with steps (methods) that are derived from the EPattern 45 instance. Four different kinds of steps (methods) are identified that correspond to the four different kinds of structural elements making tip an EPattern 34, namely, 'execute' for EPort (method/step 102), 'bind' for ERole (method/step 104), 'verify' for EConstraint (method/step 106) and 'connect' for EConnector (method/step 108). The specific implementation of each step (method) is derived from the semantics of the corresponding structural element in the pattern instance. The mapping from the semantics of an Epattern specification to the corresponding query class is explained in the following subsections (along with the numbered steps from the activity diagram) using the example pattern specification in FIG. 8. In that example, a class 111 named 'CompositeQuery' is generated as shown in FIG. 11.

EPort Execute Step 102

Figure 12:
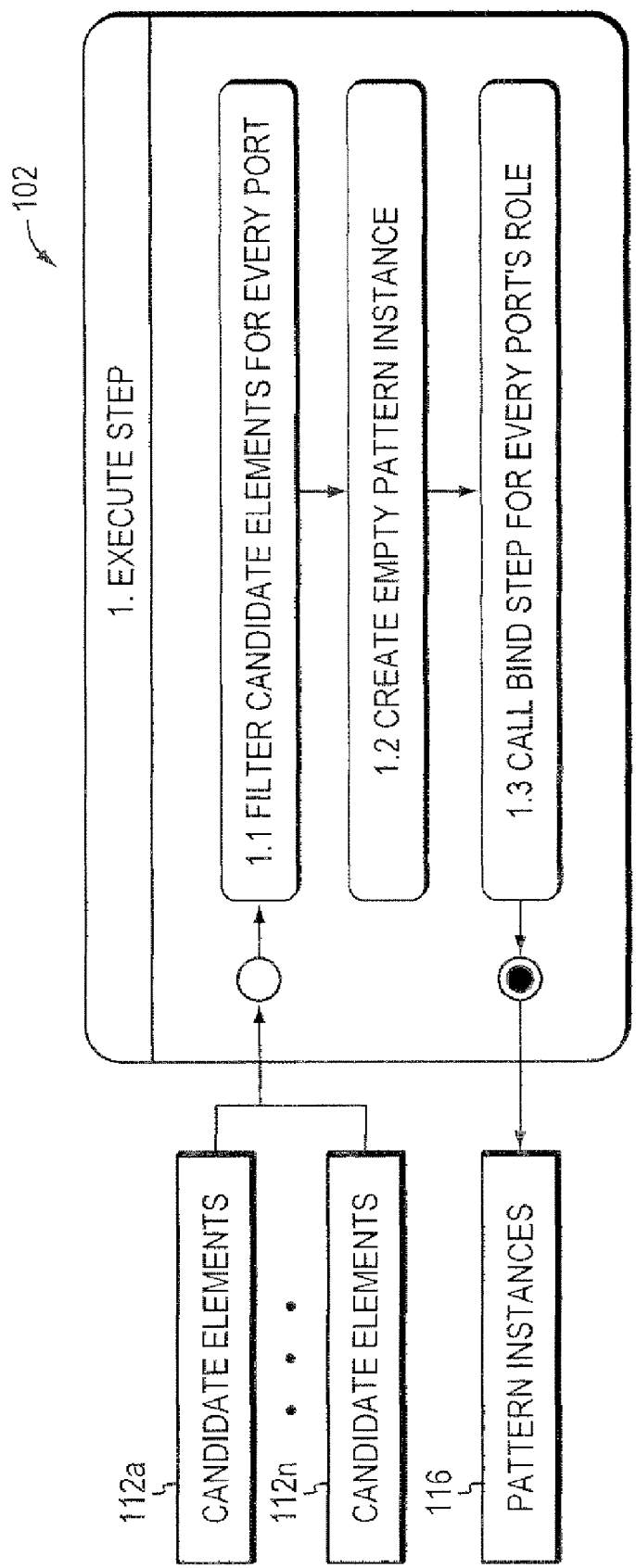
FIG. 12 is a schematic illustration of the execute method/step in one embodiment of the present invention.

The detection algorithm/process 100 starts execution at a given input port, whose EPort 48 maps to an 'execute' step 102, named after the port, on the query class. As mentioned above, an EPort 48 represents an interaction point between a pattern's external environment and its internal structure. In the context of a detection process 100, the EPorts 48 represent the entry point for detecting instances of a pattern. The first step in detection process 100 is called the 'execute' step 102. That step takes as input collections of model elements 112, each bound to one port of the pattern. The output of the EPort execute step 102 is a collection of fully bound pattern instances 116, where the pattern roles connected to the ports are bound to model elements 112 from the input collections as shown in FIG. 10 and in more detail in FIG. 12.

The execute step 102 is comprised of several sub-steps. First (sub-step 1.1), every collection of model elements that is bound to a port is filtered down to only elements that conform to the port's type. This results in a candidate collection of elements 112 for every port. In one embodiment sub-step 1.1 prepares the candidate elements depending on whether the port's delegating role represents a composed pattern or not. If it does, sub-step 1.1 calls the corresponding query's 'execute' method 102 and uses its result as candidates; otherwise the passed model elements 112 are considered as candidates.

Next in sub-step 1.2, a new 'empty' pattern instance is created. Then in sub-step 1.3, the invention process loops over the ports, in the order defined in their pattern's ePorts collection, and for each one sub-step 1.3 calls the 'bind' step 104 of the role that is connected to that port (eDelegatingRole). The 'bind' step is called with two inputs: the collection of candidate elements for the port, and a partially bound pattern instance. The output of the 'bind' step 104 is a collection of pattern instances with bindings for all roles reachable from that port and previous ports. Notice that the 'bind' step 104 corresponding to the first port is called with the new empty pattern instance, whereas calls to the 'bind' steps 104 for subsequent ports are made with pattern instances that result from previous calls, in a nested fashion. The collection of fully bound pattern instances 116 resulting from calls to the 'bind' step 104 of the role attached to the last port is the collection eventually returned (output) from the 'execute' step 102.

One special case to note here is when a port is connected to a role representing a composed pattern through one of its ports (the same situation can occur in the 'connect' step 106 when the connector's target role represents a composed pattern). In this case, the algorithm/process 100 first determines if that pattern has other ports and whether it can get candidate elements for them. A composed port has candidate elements, when it is either connected to a bound role or to a port that has already been processed in the composing pattern. If all candidate elements are available for the composed pattern, the detector 100 calls the 'execute' step 102 of that pattern's query class with those candidate elements to get back a collection of composed pattern instances. That collection is then used to call the composed role's bind' step 104, in lieu of the original candidate element collection. On the other hand, if not all candidate element collections are readily available for the composed pattern; calling the 'bind' step 104 for the composed pattern role is skipped. Once the detection process 100 finds those collections ready in subsequent steps, the composed pattern role is considered again for binding.

In the example of FIGS. 7 and 8, two execute methods 102 corresponding to the two ports 710 (componentPort and compositeport) are generated: 'executeFromComponentPort' and 'executeFromCompositePort'.

ERole Bind Step 104

Figure 13:
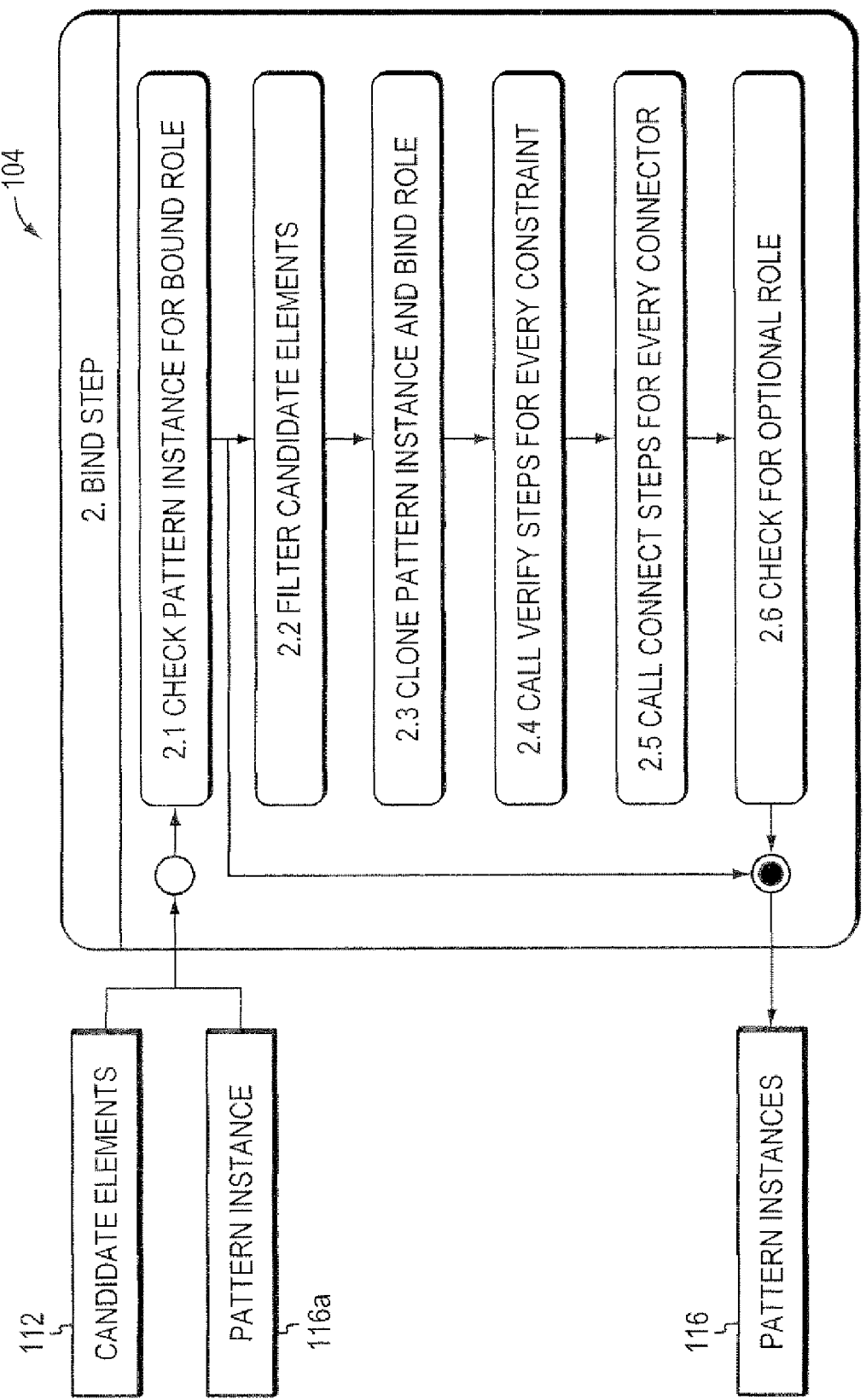
FIG. 13 is a schematic illustration of the bind method/step in one embodiment of the present invention.

For every ERole defined in the pattern's eRoles collection a 'bind' step 104, named after the role, is defined in the pattern query 111. The purpose of this step 104 is to eliminate pattern instances 116 that cannot satisfy the various structural constraints of a role and to get all variations of pattern instances (with a binding for the role) that can. The inputs for a 'bind' step are: a collection of candidate model elements 112 for binding and a pattern instance 116a. The output of the 'bind' step 104 is a collection of pattern instances, where the corresponding role is bound as shown in FIG. 13.

The implementation of the 'bind' method 104 in a preferred embodiment is as follows. First, sub-step 2.1 iterates over the model elements 112, checking their conformance to the role's type and ignoring those that do not conform. That is, if the role is already bound, sub-step 2.1 makes a further check that the model element(s) 112 bound to that role are the same as or a subset of the ones in the input candidate element collection. If that last check succeeds, the sub-step 2.1 terminates and returns the input pattern instance 116a as a result. However, if it falls, the sub-step 2.1 still terminates but with no pattern instance returned. The rationale of this sub-step 2.1 is to check that the new request to bind candidate elements to a role is consistent with a previous request that resulted in actually binding the role. If no consistency is found, a constraint is violated and the culprit pattern instance is discarded.

Next in sub-step 2.2, if the role is not already bound, then the collection of candidate elements 112 is filtered down to only those elements that conform to the role's type. At sub-step 2.3, the actual binding takes place. This is performed based on whether the role has an upperbound of 1 or *. If the role is singular, the input pattern instance 116a is cloned as many times as the number of conforming candidate elements 112. For each clone, one candidate element is bound to the role. On the other hand, if the role is a collection, the input pattern instance 116a is used to bind all the candidate elements 112 to the role.

Now, detector 100 has a collection of one or more pattern instances 116 to validate. So sub-step 2.4 loops over the role's constraints, in the order defined in the eConstraints collection, and calls the 'validate' step 106 for each corresponding constraint. The 'validate' step 106 takes as input a pattern instance 116 and returns as output a Boolean value indicating whether the constraint is satisfied for the instance. If an instance 116 fails a constraint check, it is removed from the collection of pattern instances that is used for the next constraint check in sequence. At the end of this sub-step 2.4, only pattern instances 116 conforming to all role constraints remain.

Next sub-step 2.5 traverses over every connector of the role. The detector 100 (sub-step 2.5) loops over the role's connectors, in the order defined in the eConnectors collections, and for each it calls the 'connect' step 108 that corresponds to the connector, in the direction from this role to the connector's other role. The input for the 'connect' step 108 is a pattern instance, and the output is a collection of pattern instances 116. The detector 100 takes the output collection of instances 116 and calls with them the subsequence connector's 'connect' step 108 in a nested fashion.

The final collection of pattern instances 116 resulting from calls to the last 'connect' step 108 contains all the pattern instances that survived all the role's specification constraints. Now the final sub step 2.6 is the one that determines the output value of the 'bind' step 104. The detector 100 checks the lowerbound of the role. If the lowerbound is 1 (i.e. the role is required), the bind step 104 returns the final collection of pattern instances 116 (containing binding for the role). On the other hand, if the lower-Bound is 0 (i.e. the role is optional), the bind step 104 checks if the final collection of pattern instances is empty. If it is not, the bind step 104 still returns that collection as output. However, if it is empty, the bind step 104 returns the input pattern instance as an output after binding the role to a 'null' value.

In the FIGS. 7-8 example, four methods 104 are generated for the four roles 733, 737, 735, 739: 'bindComponent', 'bindComposite', 'bindLeaf', and 'bindCompose'.

EConstraint Verify Step 106

Figure 14:
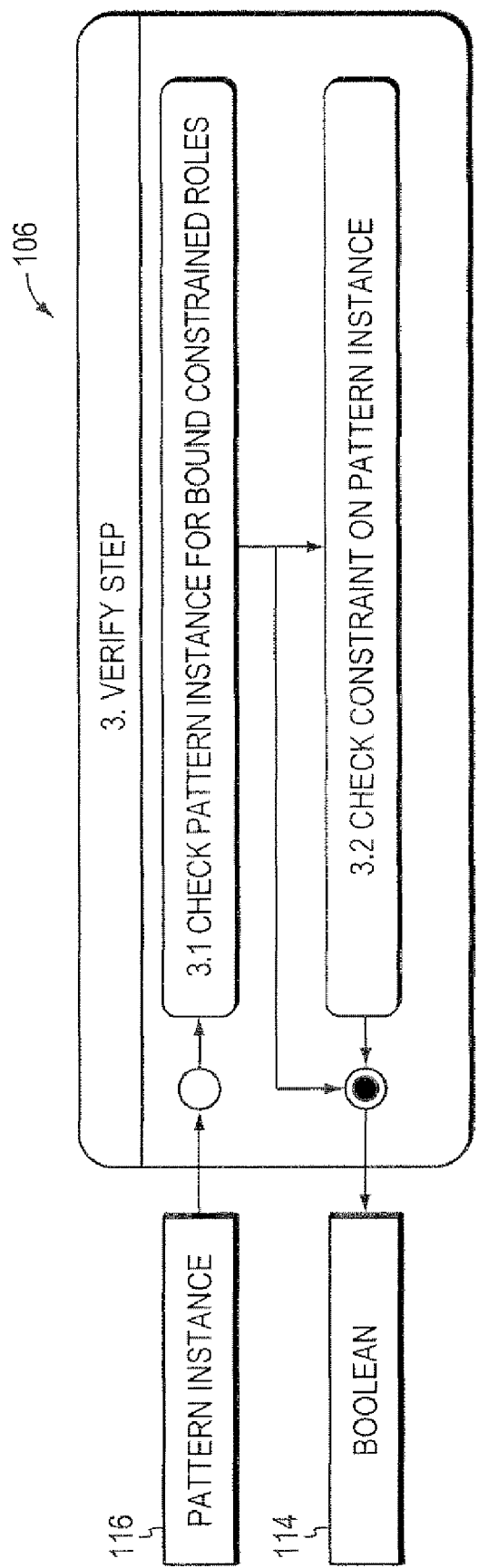
FIG. 14 is a schematic illustration of the verify method/step in one embodiment of the present invention.

For every EConstraint 44 defined in the pattern's eConstraints collection, a 'verify' step 106, named after the constraint, is defined in the pattern query 111. The purpose of the 'verify' step 106 is to validate a pattern instance 116 with the corresponding constraint. The input of a 'verify' step 106 is a pattern instance 116, and the output is a boolean value 114 representing whether the constraint is satisfied for the input pattern instance or not, as shown in FIG. 14. The 'verify' step 106 is comprised of two sub-steps. The first sub-step 3.1 checks that all the constraint's attached roles (eConstrainedRoles) have bindings in the input pattern instance 116. If at least one of them does not have a binding, the step 106 returns a result 114 of 'true'. This means the constraint cannot be checked right now and the pattern instance 116 is allowed to exist until a future 'verify' step 106 when all constrained roles have bindings. The second sub-step 3.2 involves checking the constraint by calling the constraint's corresponding 'check' method on the pattern class. The result of this check is returned as the value 114 of the 'verify' step 106.

In the example, the 'verifyParameter' method 106 is generated for the 'parameter' constraint 712*b*.

EConnector Connect Step 108

A connector is traversable in a given direction if there is a way to derive candidate elements to its ending role from an element bound to its starting role. Three traversing cases are supported: 1) a connector traversed from its source to its target using its type reference, 2) a connector traversed from its target to its source using its type reference's non-derived opposite reference, and 3) a connector traversed from its target to its source using its non-derived type reference by looking up in a reverse reference map maintained by EMF for each such reference (the map contains all the referencing elements to a given element using a specific reference). Additional traversing requirements include that the starting role of a connector has to have an upper bound of 1 (i.e., not a collection) and that a connector's ending port (if any) is an input port.

For every EConnector 47 defined in the pattern's eConnectors collection one or two 'connect' steps 108, named after the constraint, are defined in the pattern query. More specifically, if a connector is traversable in both directions, two 'Connect' steps 108 are defined; otherwise only one step 108 is defined. A 'connect' step 108 is named after the two connector's roles and type as follows:

'sourceRoleTotargetRoleUsingType' and
'targetRoleToSourceRoleUsingOppositeType' (if traversable in both directions). The input of a 'connect' step 108 is a pattern instance 116*b* and the output is a collection of pattern instances 116.

Figure 15:
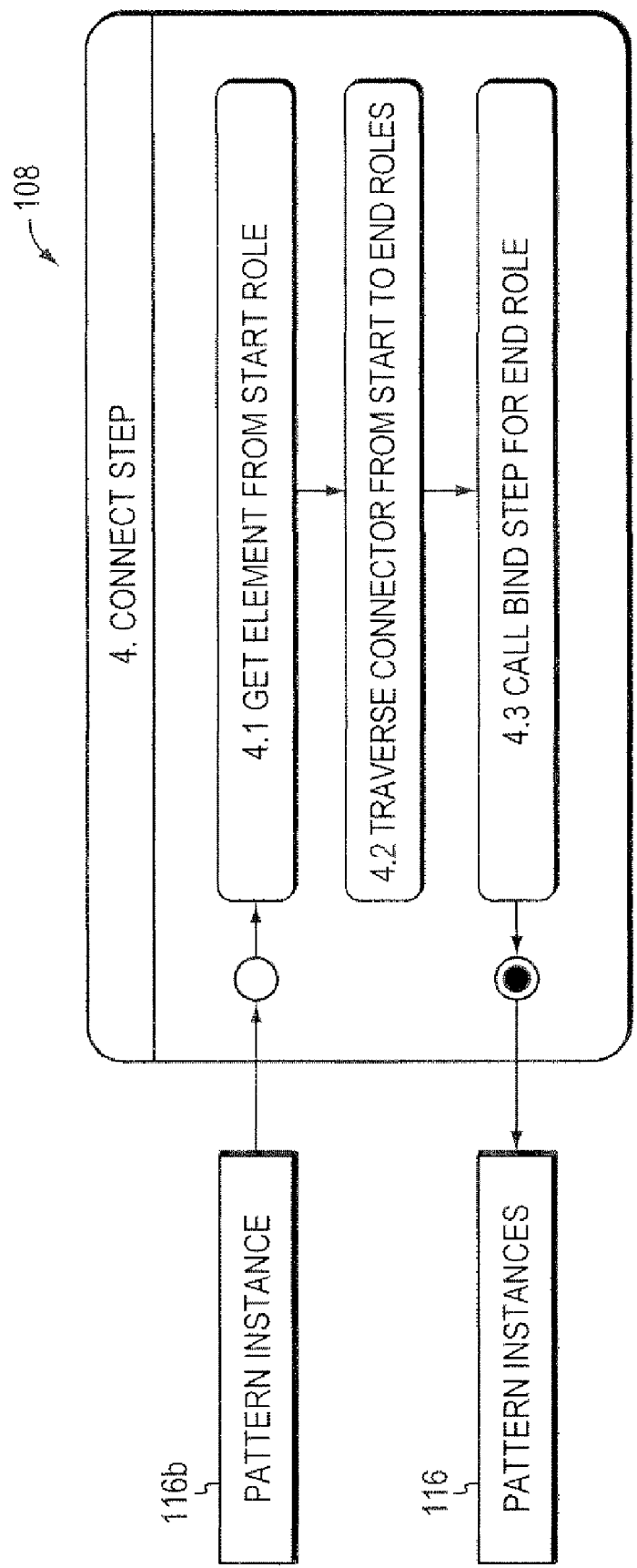
FIG. 15 is a schematic illustration of the connect method/step in one embodiment of the present invention.

The 'connect' step 108 is comprised of several sub-steps illustrated in FIG. 15. First, the sub-step 4.1 gets the model element 112 that is bound to the starting role (source role in one 'connect' step 108 and target role in the other) of the connector. If the starting role represents a composed pattern, the sub-step 4.1 calls the 'getter' method corresponding to its eSourcePort on the input pattern instance 116*b* to get the real starting model element. Next, sub-step 4.2 traverses over the connector from the starting role to the ending role, i.e. calculates the collection of candidate elements for binding at the ending role of a connector given the element 112 retrieved in sub-step 4.1 Next, sub-step 4.3 calls the 'bind' step 104 corresponding to the ending role of the connector with the collection of candidate elements and the input pattern instance 116*b*.

A special case to note here is when the target role represents a composed pattern. In that case, the handling of candidate elements is similar to the same case for EPorts 48 defined earlier, i.e., the query corresponding to the composed pattern is first executed and its return value is used as the candidate element collection to pass to the ending role's 'bind' step 104. Finally, the return value of the 'bind' method 104 is a collection of pattern instances 116 that is returned as the value of the 'connect' method 108.

In the FIGS. 7-8 example, several connect methods 108 are generated: 1) two representing the implementation connector 714*a* between the 'composite' and 'component' roles 737, 733, 2) one representing the connector 714*a* from the 'leaf' to 'component' roles 735, 733 (as the other direction is not traversable due to the 'leaf' role being a collection), 3) two representing the composition connector 714*b* between the 'composite' and 'component' roles 737, 733 and 4) two representing the connector 78 between the 'composite' and 'compose' roles 737, 739.

Epattern Query Implementation

The Epattern 12 query defined above is implemented in the PMF framework by creating a new java class template. The following gives the mapping of the Epattern query to Java, and illustrates using the composite pattern example of FIGS. 7, 8.

Query Class

An EPattern 45 query is mapped to a java class named after the pattern with a 'Query' postfix. The class has one constructor that takes one or more parameters that correspond to the pattern's ports. The parameters are ordered in the same order as the ports, and each one is named after the corresponding port and is typed with the Java Collection type. The class also defines local variables that correspond to the ports of the class, again with the same names and types as the parameters. The constructor basically sets the parameters to the local variables. The constructor is used to create instances of the query class by calling it with collections of candidate elements for every port.

In the example, the following java artifacts are created: a class 'CompositeQuery' 111, (FIG. 11), a constructor 'CompositeQuery(compositePort: Class)', and a local variable 'compositePort: Class'.

Execute Method 102

The query class for a pattern always has one execute method 102 that takes no parameters and returns a Java Collection. The method is called on a query instance after one is created. The method implementation corresponds to the logic defined for the EPort execute method 102 above.

In the example, one 'execute( )' method 102*a* is defined as shown in FIG. 11.

Bind Method 104

The pattern query class contains a bind method 104 for every defined role of the pattern. The method is named after the role with a 'bind' prefix. The method also has two parameters one is named 'candidates' and is typed with Java Collection and the other is named 'instance' and is typed with the java interface representing the EPattern 45. The method return type is Java Collection.

In the example, four bind methods 104*a* (FIG. 11) are created: 'bindComposite', 'bindComponent', 'bindLeaf' and 'bindCompose'.

Verify Method 106

The pattern query class contains a verify method 106 for every defined constraint of the pattern. The method is named after the constraint with a 'verify' prefix. The method also has one parameter named 'instance' and typed with the java interface representing the EPattern 45, and has a return type of Java Boolean.

In the example, one verify method is created; that is the 'verifyParameter' method 106a (FIG. 11).

Connect Method 108

The pattern query class contains one or two connect methods 108 for every connector defined in the pattern, depending on whether the connector is traversable in one or two directions. The name of the connect methods follow the format: 'connectStarttoEndWithType', where 'Start' is the name of the starting role, 'End' is the name of the ending role, and 'Type' is the name of the connector's EReference type in that direction. Each connect method 108 takes one parameter named 'instance' typed with the Java interface representing the EPattern 45, and has a return type of Java Collection.

In the example, eight connect methods 108a (FIG. 11) are created for the pattern's four connectors 74a, b, 78, 714a which are traversable in both directions. More specifically, the following methods 108a which are created:
'connectCompositeToComposeUsingOwedOperation',
'connectComposeToCompositeUsingClass',
'connectCompositeToComponentlUsingImplementedInteface',
'connectComponentToCompositeUsingImplementingClassifier',
'connectCompositeToComponentUsingComposedType',
'connectComponentToComposeUsingComposingClassifier',
'connectComponentToLeafUsingImplementingClassifier' and
'connectLeafToComponentUsingImplementedInterface'.

Epattern Detection Example

Figure 16:
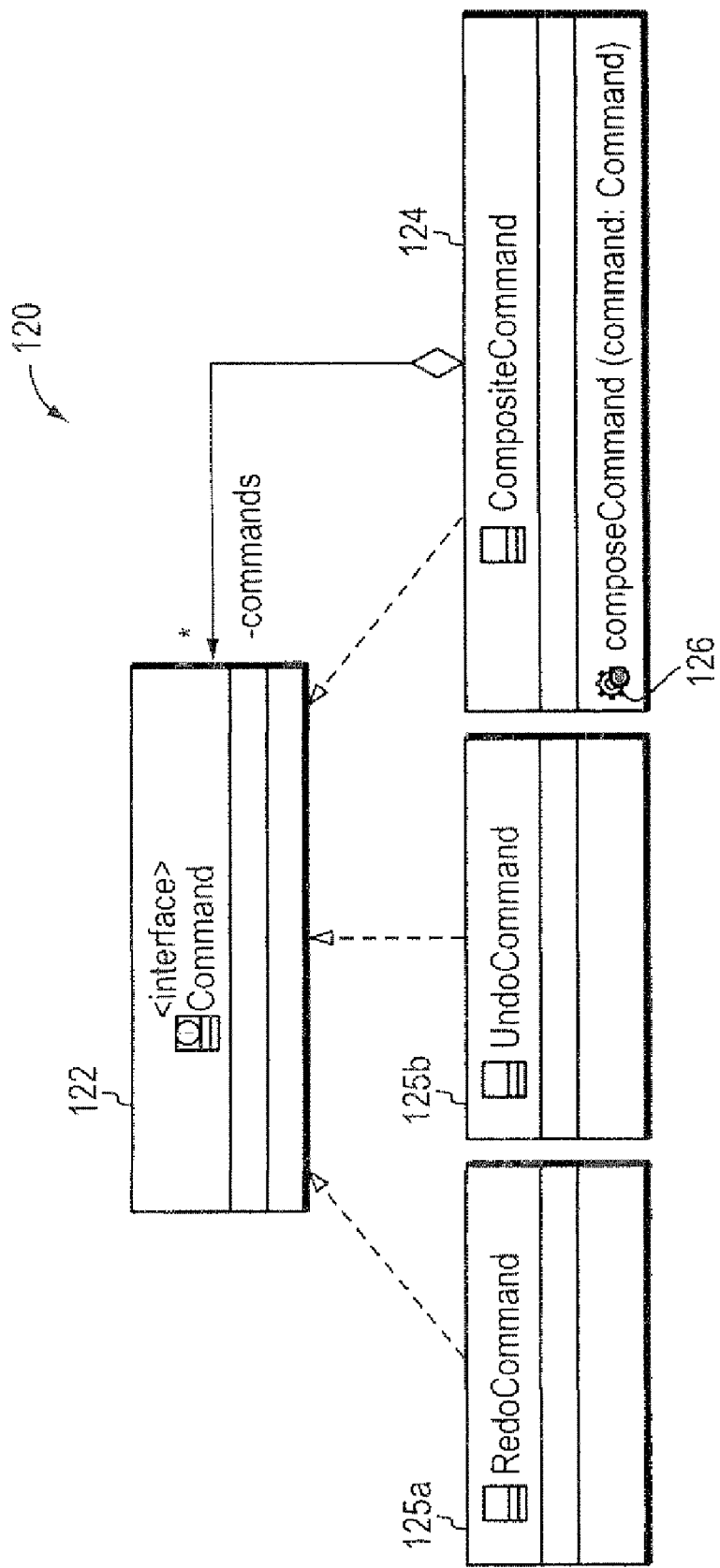
FIG. 16 is the composite command class diagram in an embodiment of the present invention.
Figure 17:
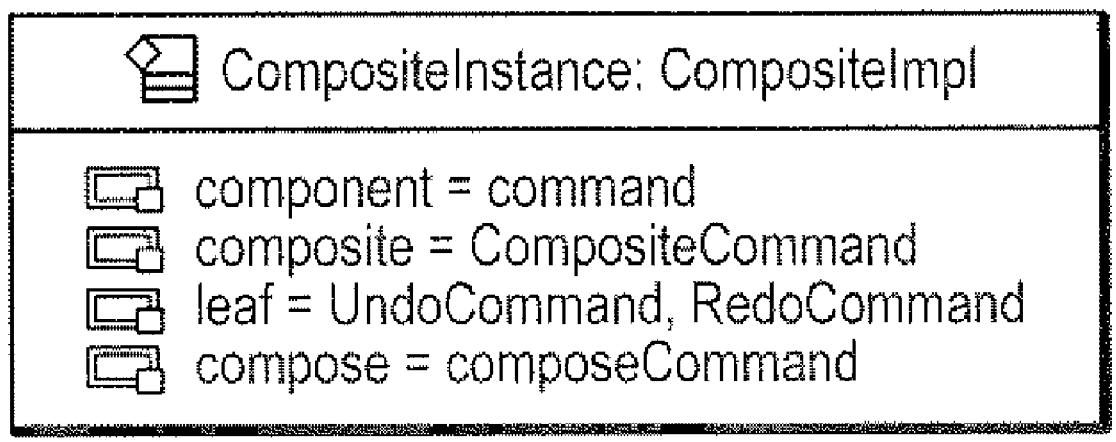
FIG. 17 illustrates a conforming composite pattern instance of the FIG. 16 class, when leaf is a collection role.
Figure 18:
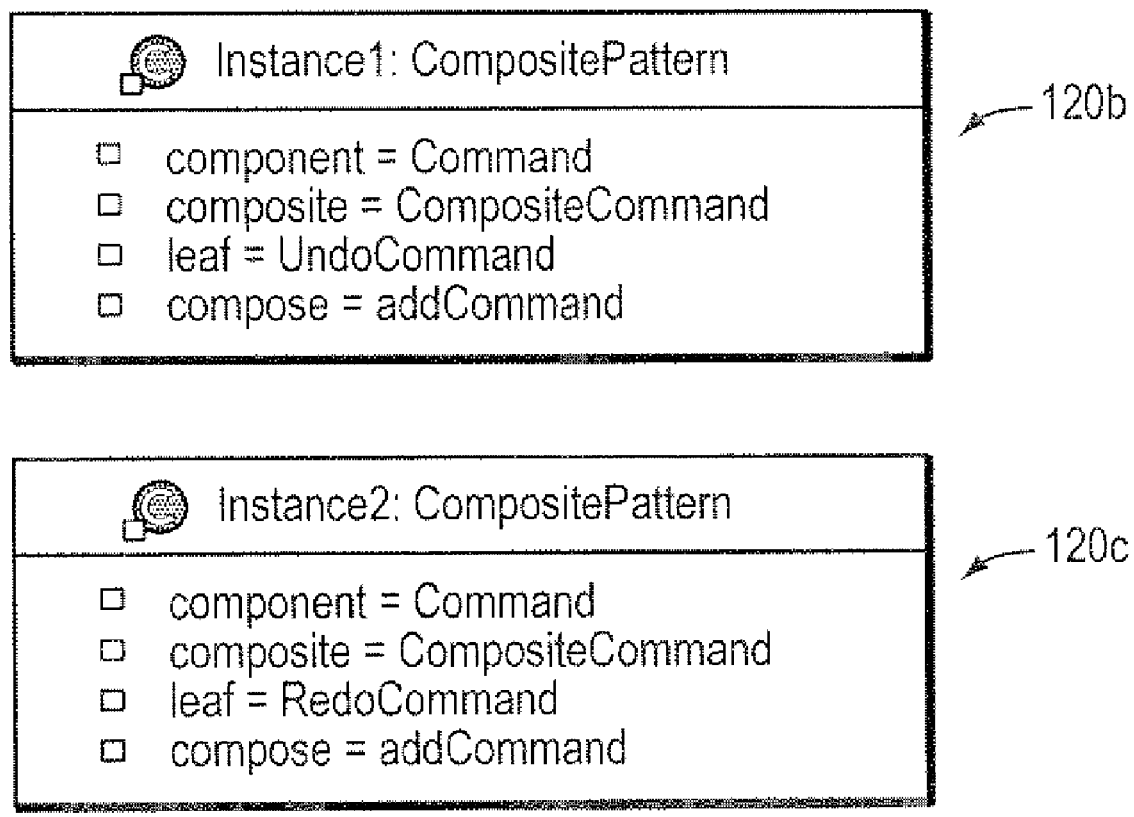
FIG. 18 illustrates two composite pattern instances of the FIG. 16 class when leaf is an individual role.

An example of a composite pattern 120 (class diagram thereof) is shown in FIG. 16. The example pattern/class diagram 120 represents an application of the above detailed composite pattern to commands in a UML user model. In this example, the following elements are identified: the 'Command' UML interface 122 playing the 'component' role, the 'CompositeCommand' UML class 124 playing the 'composite' role, the 'UndoCommand' and 'RedoCommand' UML classes 125a, b playing the 'leaf' role and finally the 'addCommand' UML operation 126 playing the 'compose' role. When the CompositePatternQuery class is run against a user model containing these elements, the composite pattern instance 120a in FIG. 17 results. If the 'leaf' role has a multiplicity upper bound of 1 (versus *), the pattern instances 120b, c in FIG. 18 result instead.

Tool Architecture and Implementation

Figure 19:
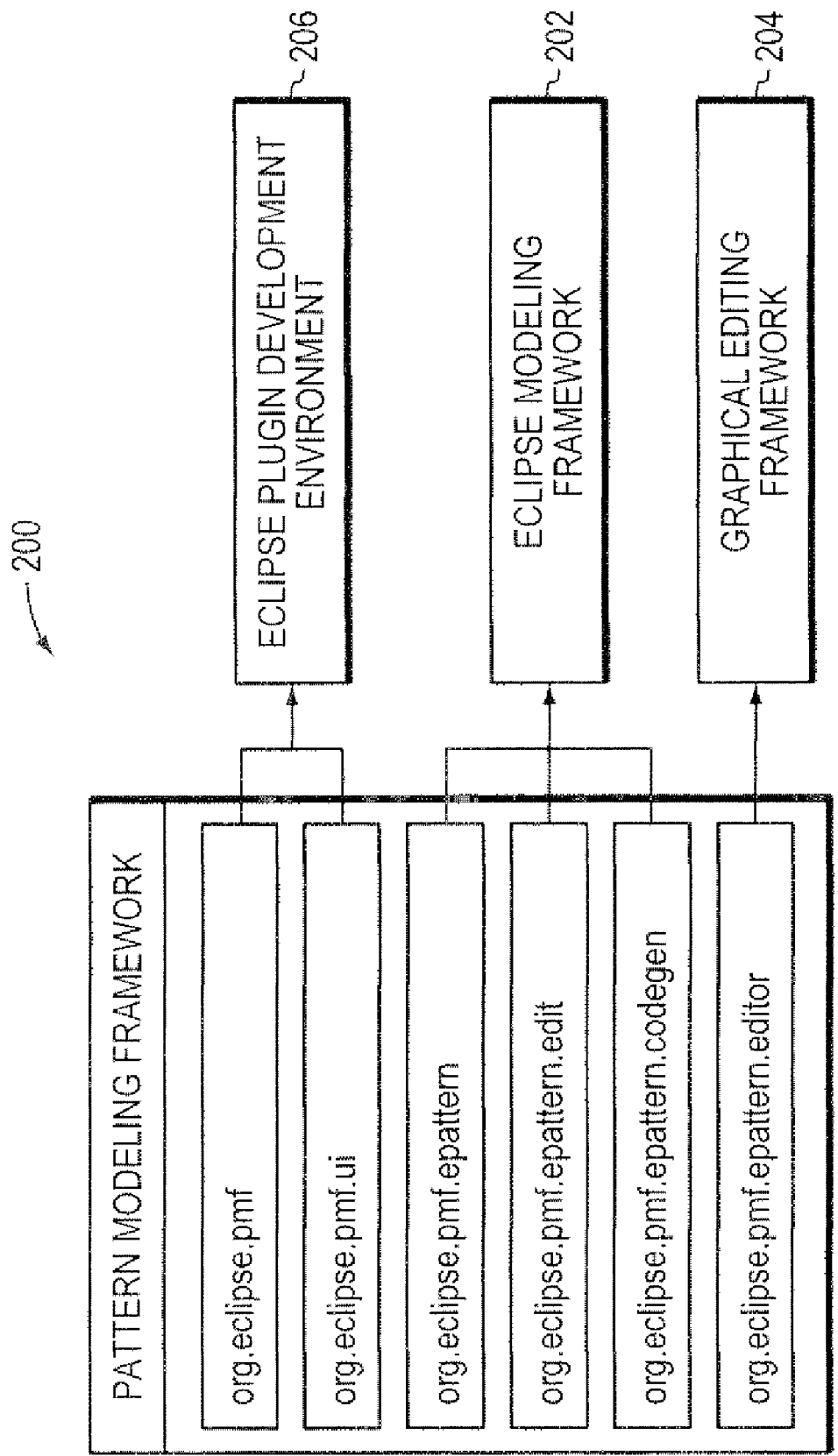
FIG. 19 is a block diagram of the invention pattern modeling framework (PMF) and its implementation dependencies.
Figure 20:
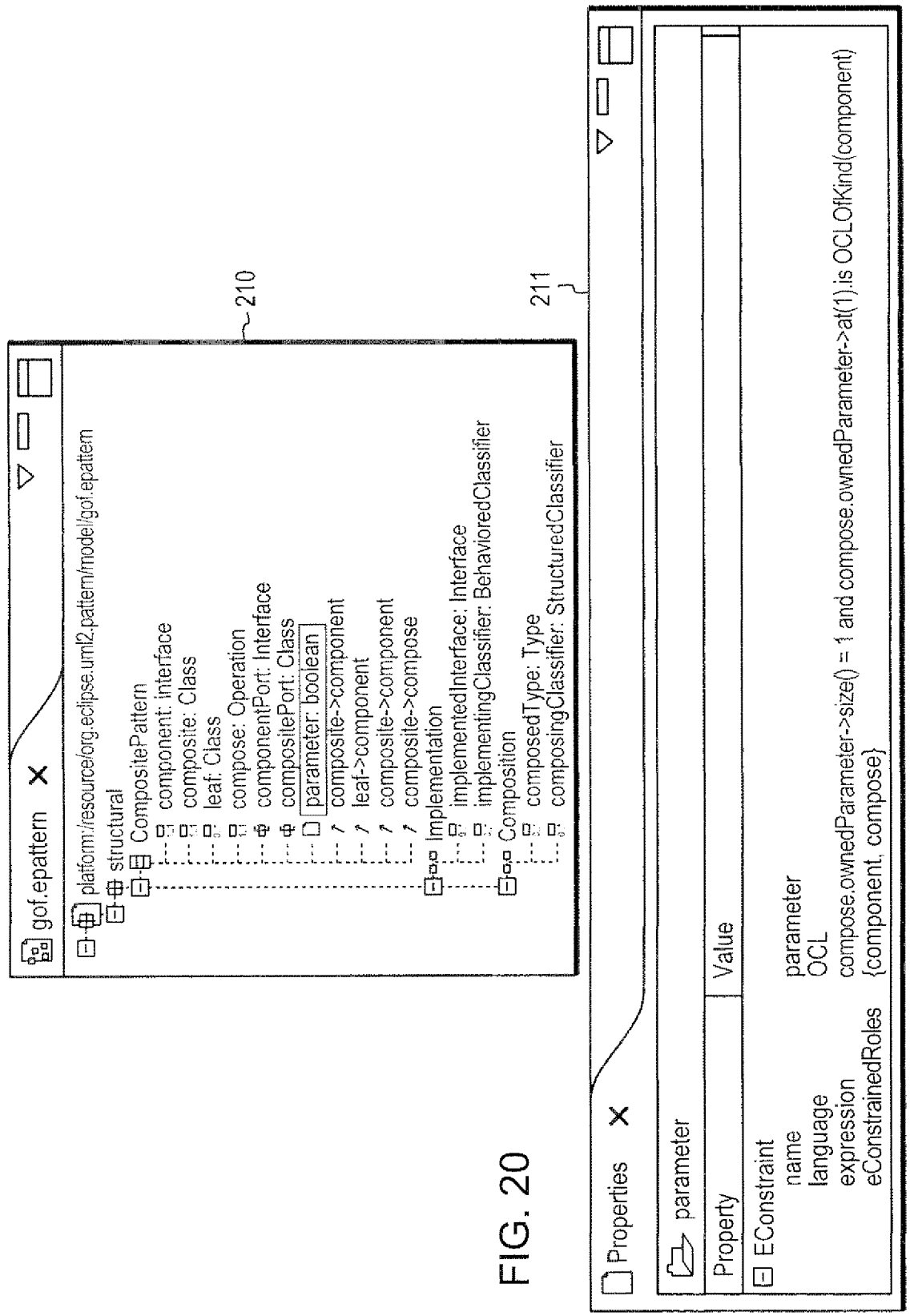
FIG. 20 is a schematic view of an Epattern tree viewer and property sheet in embodiments of the present invention.

The invention PMF framework 200 is implemented in one embodiment as a set of java plug-ins to the Eclipse platform as shown in FIG. 19. It uses three Eclipse-based open source frameworks, namely the Eclipse Modeling Framework (EMF) 202 and the Graphical Editing Framework (GEF) 204 and the Java Emitter Templates framework (JET). PMF uses EMF to create the Epattern meta-model, generate corresponding java model APIs and generate basic user interface (UI) components to edit the Epattern instances 12 like a tree viewer 210 and a property sheet page 211, as shown in FIG. 20. PMF also uses EMF to create a notation meta-model to represent the notational aspects of Epattern 12 and generate corresponding Java API for them.

Figure 21:
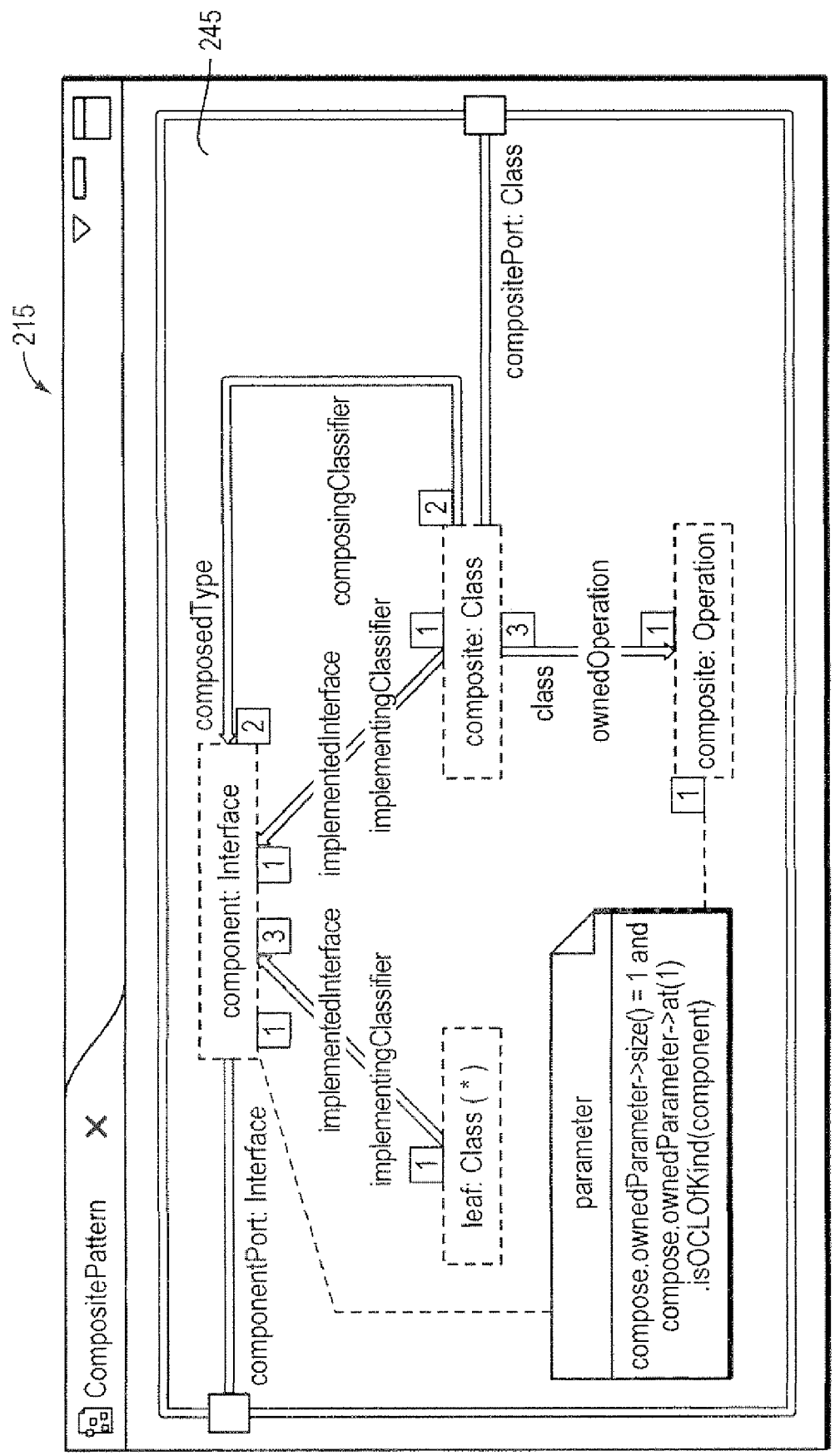
FIG. 21 illustrates an Epattern specification editor in embodiments of the present invention.

PMF uses the GEF to create a much elaborate diagram-based editor 215 for the EPattern instances 245, as shown in FIG. 21. Further PMF uses JET along with EMF to implement a code generator for the Java artifacts (model and query API) that correspond to EPattern instances 245.

The EMF framework provides facilities to specify meta-models using Ecore. PMF uses these facilities to specify the Epattern meta-model, which means that Epattern 12 is both specified using Ecore and as an extension to Ecore described above. Once meta-models are specified in Ecore, EMF at 206 (FIG. 19) provides code generation of corresponding Java model API's. Several kinds of Eclipse plug-ins 206 can be generated: a model plug-in containing java interfaces that correspond to the meta-model EClasses along with their implementation classes that also allow for model serialization in the XMI (by OMG) format, an edit plug-in containing basic Eclipse UI support for editing meta-model instances, and an editor plug-in containing a simple treebased Eclipse editor for these instances. PMF generates these three types of plug-ins for the Spattern meta-model 14.

However, the tree-based editor generated by EMF does not show EPattern's graphical notation, which is important to view and understand the structure of patterns and to facilitate the specification process. That is why another framework called the Graphical Editing Framework (GEF) 204 is used to develop a much elaborate diagram editor for EPattern instances. GEF allows for building rich diagram editors for arbitrary models using a model-view-controller architecture. It provides class hierarchies that can be further extended to fully define the view and controller parts of the architecture, whereas it leaves the model part as user defined. PMF provides an extension to GEF's framework by defining the model part of the architecture to be the Epattern model elements (FIG. 4b). This results in the diagram editor 215 shown in FIG. 21.

PMF also creates specializations of viewers and controllers for the Epattern concepts.

Users of PMF are expected to use the Epattern graphical editor 215 to specify their patterns and serialize them to pattern repositories in XMI format. As Epattern is an extension of Ecore, its instances (the patterns 14) are defined at the meta-model level (M2) and are conforming to Ecore instances. This allows PMF to reuse EMF's code generation tools on Epattern instances 245 to generate corresponding Java model API's. To handle the extra Epattern semantics, extended code generation templates are provided by PMF as described above. PMF also provides new code generation templates for generating query classes 111 from Epattern instances 245 implementing pattern detection 100. Using these code generation capabilities, PMF users can generate java code that corresponds to their pattern specifications as explained above.

CONCLUSIONS

Detecting (un)desirable patterns is an important component of model analysis. But patterns need to be formally specified before they can be manipulated by tools. The specification approach should ideally support patterns of any MOF-compliant language and be able to scale to patterns of different complexities. In this disclosure, Applicant presents the PMF framework and its Epattern specification language that specifically targets such properties. In the context of the OMG's 4-layer meta-modeling architecture, Epattern 12 has M3 semantics used to specify patterns 14 at the M2 level. In that sense, a pattern 14 is specified as a meta-class, its roles as meta-features and its constraints as Boolean meta-operations. This enables patterns to be instantiated, inherited and composed.

Also demonstrated in the disclosure is a method and means to generate a pattern detection algorithm (process or sequence 100) from a pattern specification, thus automating the detection of pattern instances in user models. Another usability feature Applicant is investigating is the ability to pre-bind some roles to speed up the detection algorithm. This feature will help users focus their attention to parts of their model (versus the whole model) by prebinding some roles with particular elements and only look for the rest of the role bindings. Another additional feature is the ability to designate several patterns as variants of a common pattern and leverage this knowledge in designing an amalgamated detection algorithm for that family of patterns. Applicant expects to use pattern inheritance and refinement in the specification of such families of patterns.

Applicant has also presented here a pattern specification and detection tool that integrates with the RSA (Rational Software Architect) tool to allow pattern authors to graphically specify their patterns, generate detection algorithms for them and run them against user models created with RSA. The tool implementation provides a definition of the Epattern meta-model using EMF along with the corresponding java API, a diagram editor for the graphical specification of EPatterns, basic UI components for editing the properties of Epattern model elements and a code generator for a detection algorithm from a specification.

Figure 22A:
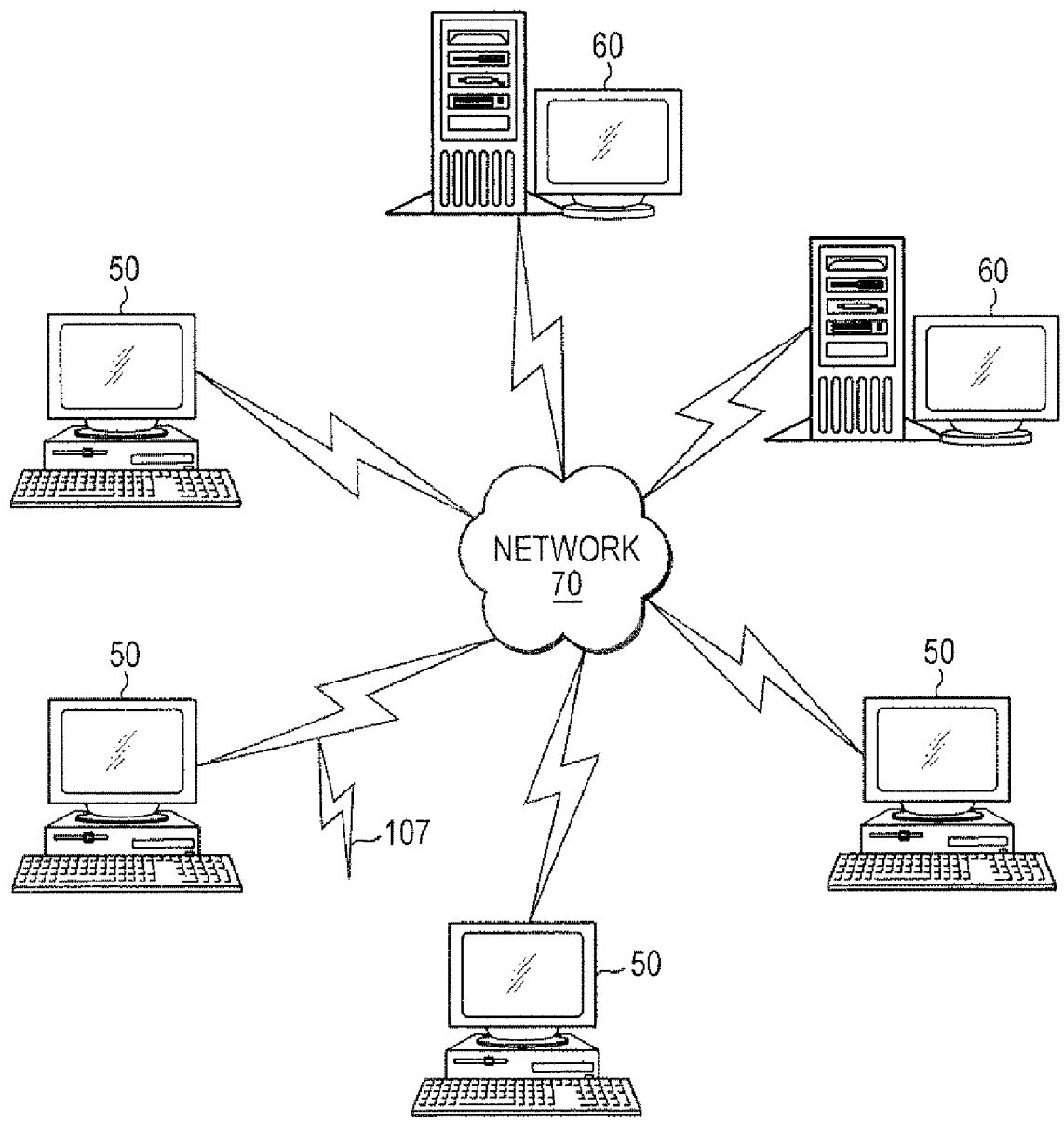
FIGS. 22A and 22B are schematic and block diagrams, respectively, of a computer network system in which embodiments of the present invention are deployed.

FIG. 22a is a schematic view of a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 22B:
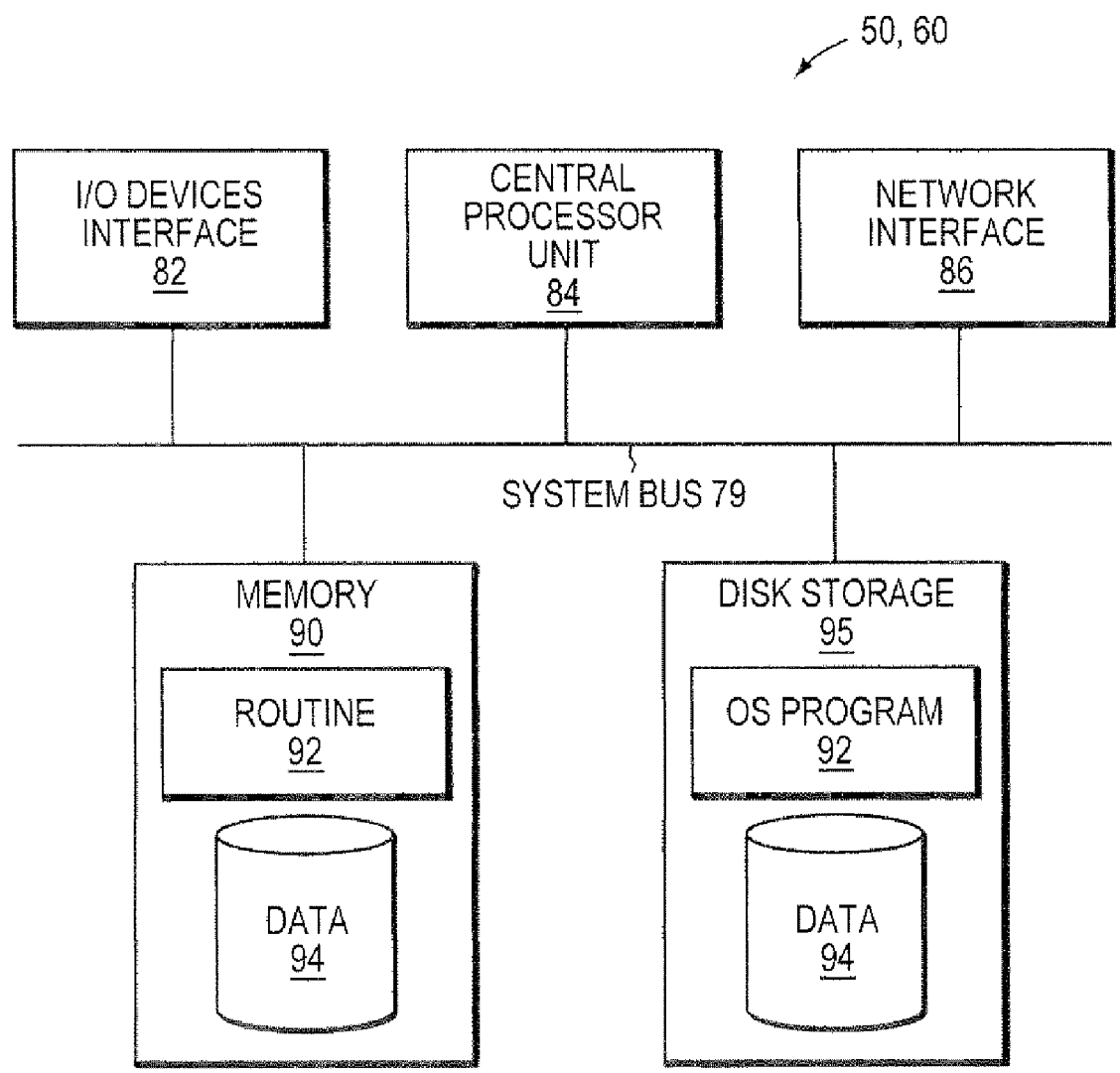

FIG. 22b is a diagram of the internal structure of a computer (e.g., client processor/device 50 or server computers 60) in the computer system of FIG. 22a. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 12a). Memory 90 provides volatile storage for computer software instructions 92 and data 94 used to implement an embodiment of the present invention (e.g., Epattern language specification 12, meta-model patterns 14, pattern instances 16, user objects 17, detector 100 and its processes, and the like detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM) a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to example embodiments thereof, it will be understood by those skilled in the art that various changes in form and details may be made therein without departing from the scope of the invention encompassed by the appended claims.

For example, the present invention pattern detection is able to specify good patterns and anti-patterns in the same way. Thus, references to "patterns" herein discussion equally apply to anti-patterns. To that end, the foregoing describes model analysis through the detection of predefined patterns and anti-patterns.

The present invention provides a generic pattern detection system (method and apparatus) that takes a pattern specification as input and automatically detects instances of such a pattern in user models. The invention detector (detection method) is systematic but configurable by semantics in the pattern specification. This allows the developer to guide the flow of the detection process (sequence).

APPENDIX A: EPATTERN META-MODEL DESCRIPTION

The following is a description of the new concepts in the Epattern meta-model. It includes description of new features (marked with '*') and inherited ones (from Ecore):
1. ECatalog→EPackage
It represents a namespace for patterns and new associations
name: String
It specifies a name for the catalog
*eSubCatalogs: ECatalog (non-containment, ⊆ eSubpackages)
A collection of nest catalogs in that catalog
*ePatterns: EPattern (non-containment, ⊆ eClassifiers)
A collection of patterns in that catalog
*eAssociations: EAssociation (non-containment, ⊆ eClassifiers)
A collection of associations in that catalog
2. EPattern→EClass
It represents a pattern specification
name: String
It specifies a name for the pattern.
abstract: boolean
It specifies whether the pattern is abstract or concrete.
*cSuperPattern: EPattern (non-containment, eSuperTypes)
A reference to the pattern's super pattern
*eroles: ERole (non-containment, ⊆ eStructuralFeatures)
A collection of references to the pattern's roles
*econstraints: EConstraint (non-containment, ⊆ eOperations)
A collection of references to the pattern's constraints
*ePorts: EPort (containment)
A containment collection of references to the pattern's ports
*econnectors: EConnector (containment)
A containment collection of pattern's connectors
3. ERole→EReference
It represents a pattern role
name: String
It specifies a name for the pattern role.
lowerBound: int
It specifies a lower bound on the role's multiplicity. A value of 0 or 1 indicates whether the role is optional or required respectively.
upperBound: int
It specifies an upper bound on the role's multiplicity. A value of * or 1 indicates whether the role is collection or singular respectively.
eType: EClass (non-containment)
A reference to the role's type, which can either be an EClass from the pattern's target meta-model or an EPattern representing a composed pattern
containment: boolean
It specifies whether the role represents a composed pattern or not.
*econstraints: EConstraint (non-containment)
An 'ordered' collection of reference to the role's constraints
*eConnectors: EConnector (non-containment)
An 'ordered' collection of reference to the role's connectors
4. EConnector→REModelElement
It represents a connector between two pattern roles
*eSourceRole: ERole (non-containment)
A reference to the connector's source role
*eTargetRole: ERole (non-containment)
A reference to the connector's target role
*eSourcePort: EPort (non-containment)
A reference to the connector's source port if the source role represents a composed pattern
*eTargetPort: EPort (non-containment)
A reference to the connector's target port if the target role represents a composed pattern
*eType: EReference (non-containment)
A reference to the connector's type, which can either be an EReference from the pattern's target meta-model or an EAssociationEnd of a derived association
5. EPort→ETypedElement
It represents a port on the boundary of a pattern that connects to a pattern role
name: String
It specifies a name for the pattern port.
etype: EClass (non-containment)
A reference to the port's type, which is an EClass from the pattern's target meta-model (the type has to match that of the delegating port if specified; otherwise that of the delegating role)
* eDelegatingRole: ERole (non-containment)
A reference to a role connected to the port
*eDelegatingPort: EPort (non-containment)
A reference to a port on another pattern if the delegating role represents a composition of that pattern
6. EConstraint→EOperation
It represents a constraint on one or more pattern roles
name: String
It specifies a name for the pattern constraint.
*expression: String
It specifies a boolean-typed expression in the context of an instance of the pattern
language: String
It specifies a constraint language (e.g. EMOF OCL) used for the expression
*eConstrainedRoles: ERole (non-containment)
A collection of references to the constrained pattern roles 7. EAssociation→EClass
It represents a new derived association between two EClasses from the pattern's target meta-model
name: String
It specifies a name for the association
*eAssociationEnds: EAssociationEnd (containment)
A containment collection of the two association ends
8. EAssociationEnd→EReference
It represents an end in a derived association
name: String
It specifies a name for the association end
lowerBound: int
It specifies a lower bound on the association end's multiplicity.
upperlBound: int
It specifies an upper bound on the association end's multiplicity.
eType: EClass (non-containment)
A reference to an EClass from the pattern's target meta-model typing the association end
*navigable: boolean
It specifies whether instances of this association end's type can be derived from an instance of the opposite association end's type
*eOppositeEnd: EAssociationEnd (non-containment, ⊆ eOpposite)
A reference to the opposite association end if both ends are navigable
*expression: String
It specifies an expression in the context of an instance of the opposite association end's type used to derive instances of this association end's type
*language: String
It specifies a language (e.g. EMOF OCL) used for the derivation expression

What is claimed is:

1. A computer method for detecting patterns in structured models, comprising the steps of:
    using a digital processor, obtaining a pattern specification of a subject pattern, the pattern specification (a) defining the subject pattern as a meta-class in a target domain instead of as a meta model, and (b) specifying one or more pattern roles as meta-properties of the subject pattern; and
    in processor memory configured to select patterns in structured models, using the pattern specification, navigating user models, each user model having respective model elements, said navigating including looking for structures of model elements that fulfill the pattern roles, and returning conforming pattern instances as detected instances of the subject pattern.

2. A method as claimed in claim 1 further comprising the step of deriving a pattern detection sequence from the pattern specification.

3. A method as claimed in claim 2 wherein the pattern specification specifies certain ordering which influences flow control of the pattern detection sequence.

4. A method as claimed in claim 2 wherein the pattern detection sequence is customized by certain semantics specified in the pattern specification.

5. A method as claimed in claim 1 wherein the target domain is a computer programming model; and
    the pattern meta-class is a meta-class in an object oriented model.

6. A method as claimed in claim 1 wherein the subject pattern is any of a desired pattern and an anti-pattern.

7. A method as claimed in claim 1 wherein the target domain is a UML2 structure.

8. Computer apparatus for detecting patterns in a structured model, comprising:
    a digital processor having a pattern specification of a subject pattern, the pattern specification (a) defining the subject pattern as a meta-class in a target domain instead of as a meta model, and (b) specifying one or more pattern roles as meta-properties of the subject pattern; and
    a detector operatively coupled to the digital processor and configured to automatically detect patterns in a structured model, given one or more user models, each user model having respective model elements, the detector using the pattern specification and navigating the user models looking for structures of model elements that fulfill the pattern roles, the detector indicating on output conforming pattern instances as detected instances of the subject pattern.

9. Computer apparatus as claimed in claim 8 wherein the detector derives a pattern detection sequence from the pattern specification.

10. Computer apparatus as claimed in claim 9 wherein the pattern specification specifies certain ordering which influences flow control of the pattern detection sequence.

11. Computer apparatus as claimed in claim 9 wherein the pattern detection sequence is customized by certain semantics specified in the pattern specification.

12. Computer apparatus as claimed in claim 8 wherein the target domain is a computer programming model; and
    the pattern meta-class is a meta-class in an object oriented model.

13. Computer apparatus as claimed in claim 8 wherein the subject pattern is any of a desired pattern and an anti-pattern.

14. Computer apparatus as claimed in claim 8 wherein the subject pattern inherits structure of a relatively abstract pattern.

15. Computer apparatus as claimed in claim 8 wherein the target domain is a UML2 structure.

16. A pattern detector for detecting patterns in a structured model comprising:
    in a digital processor:
    means for specifying a subject pattern, the specification means (a) defining the subject pattern as a meta-class in a target domain instead of as a meta model, and (b) specifying one or more pattern roles as meta-properties of the subject pattern;
    given one or more user models, each user model having respective model elements, detector means for using the pattern specification and navigating the user models looking for structures of model elements that fulfill the pattern roles, the detector means indicating conforming pattern instances as detected instances of the subject pattern.

17. A pattern detector as claimed in claim 16 further comprising derivation means for deriving a pattern detection sequence from the pattern specification.

18. A pattern detector as claimed in claim 17 wherein the pattern specification specifies certain ordering which influences flow control of the pattern detection sequence.

19. A pattern detector as claimed in claim 17 wherein the pattern detection sequence is customized by certain semantics specified in the pattern specification.

20. A pattern detector as claimed in claim 16 wherein the target domain is a computer programming model; and
    the pattern meta-class is a meta-class in an object oriented model.

21. A pattern detector as claimed in claim 16 wherein the subject pattern is any of a desired pattern and an anti-pattern.

22. A pattern detector as claimed in claim 16 wherein the subject pattern inherits structure of a relatively abstract pattern.

23. A computer program product comprising:

a computer readable storage medium having computer usable program code for pattern detection in a meta-model environment, said computer program product including:

computer usable program code for generating a pattern specification of a subject pattern, the pattern specification (a) defining the subject pattern as a meta-class in a target domain instead of as a meta model, and (b) specifying one or more pattern roles as meta-properties of the subject pattern;

computer usable program code for deriving a pattern detection sequence from the pattern specification;

computer usable program code for applying the derived pattern detection sequence to user models, each user model having respective model elements, said applying including navigating a user model looking for structures of model elements that fulfill the pattern roles and outputting conforming pattern instances as detected instances of the subject pattern.

24. A computer program product as claimed in claim 23 wherein the pattern specification specifies certain ordering which influences flow control of the pattern detection sequence.

25. A computer program product as claimed in claim 23 wherein the pattern detection sequence is customized by certain semantics specified in the pattern specification.

26. A computer program product as claimed in claim 23 wherein the subject pattern is any of a desired pattern and an anti-pattern.

* * * * *